United States Patent [19]

Trolinger et al.

[11] Patent Number: 5,682,236
[45] Date of Patent: Oct. 28, 1997

[54] REMOTE MEASUREMENT OF NEAR-SURFACE PHYSICAL PROPERTIES USING OPTICALLY SMART SURFACES

[75] Inventors: James Davis Trolinger, Costa Mesa; James Elstin Millerd, Huntington Beach, both of Calif.

[73] Assignee: Metrolaser, Irvine, Calif.

[21] Appl. No.: 87,501

[22] Filed: Jul. 2, 1993

[51] Int. Cl.$^6$ .................................................. G01B 9/02
[52] U.S. Cl. ...................... 356/345; 356/349; 356/28.5; 356/35.5
[58] Field of Search .................... 356/35.5, 28.5, 356/349, 356, 345; 385/15

[56] References Cited

U.S. PATENT DOCUMENTS

| | | | |
|---|---|---|---|
| 3,953,128 | 4/1976 | Holly | 356/349 |
| 4,690,552 | 9/1987 | Grant et al. | 356/35.5 |
| 4,850,693 | 7/1989 | Deason et al. | 356/35.5 |
| 5,141,317 | 8/1992 | Bollhagen et al. | 356/356 |

*Primary Examiner*—Samuel A. Turner
*Attorney, Agent, or Firm*—William L. Chapin

[57] ABSTRACT

A method and apparatus for remotely measuring such physical properties as surface temperature and strain on or near the surface of an object such as an aerodynamic model utilizes a sensor comprising a holographic diffraction grating in a thin film, formed on or affixed to the surface of the test object, thereby forming an "optically smart surface." The sensor is remotely illuminated by one or more optical address beams, which are preferably coherent laser beams. Optical beams diffracted from the surface of the sensor produce interference patterns in a remote photodetection apparatus which permits measurement in changes in grating spatial frequency caused by temperature changes or mechanical deformations of the object surface, or Doppler measurement of particle velocity in a sample volume produced by intersecting beams diffracted from the sensor hologram.

22 Claims, 30 Drawing Sheets

Recording

Replay

Signal To PZT

Initial Signal From Detector

Signal To PZT

Phase Shift Signal From Detector

Recording

Playback 1.3 cm probe volume plane 2.0 cm 2.6 cm

REMOTE MEASUREMENT OF NEAR-SURFACE PHYSICAL PROPERTIES USING OPTICALLY SMART SURFACES

BACKGROUND OF THE INVENTION

A. Field of the Invention

The present invention relates to the field of remote sensing and testing. More particularly, the invention relates to methods and apparatus for remotely measuring near-surface physical properties, such as aerodynamic properties of a wind tunnel model or wall, or of an airborne object such as an aircraft or missile, which employs holographic optical elements fastened to a surface to be tested.

B. Description of Background Art

Optical diagnostic techniques are widely used in wind tunnels to make remote, non-contacting, i.e., nonintrusive measurements of air flow as well as to measure various characteristics of models. Measurements at different locations of a model or wind tunnel surface (multipoint) and of various parameters such as temperature, flow velocity, etc. (multiparameter) are presently made by diagnostic instruments requiring an array of measurement techniques. These include laser velocimetry, flow visualization, spectroscopy and mechanical probes. The following United States patents typify prior art remote measurement techniques that may be employed in wind tunnel testing:

Williams, U.S. Pat. No. 2,434,029, Jan. 6, 1948, Interferometer Apparatus for Quantitively Determining Fluid Pressures in Wind Tunnels:

Discloses an interferometer apparatus for remotely measuring air pressures in the vicinity of a model in a wind tunnel. The apparatus includes a source of quasi-monochromatic light split into two beams, a reference beam and a sample beam that are transmitted through windows provided in a reference chamber (dummy tunnel) and model chamber (wind tunnel) to a common concave mirror, which reflects the beams back through the chambers to the beam splitter, which for the return beams functions as a beam combiner that forms interference patterns which may be photographed. The wind tunnel and dummy tunnel are connected by an air pressure equalizer tube.

Bhuta, et al., U.S. Pat. No. 3,911,733, Oct. 14, 1975, Optical Signature Method and Apparatus for Structural Integrity Verification:

Discloses a method and apparatus for periodically evaluating the structural integrity of a load bearing structure such as an airplane wing by recording on the same holographic recording medium two successive holograms of the structure while the later is in two different stress conditions, respectively, to produce a holographic interferogram which may be reconstructed to create a deformation fringe pattern representing the deformations in the structure resulting from the change in the stress conditions. This deformation pattern is compared with an earlier deformation pattern of the structure resulting from the same stress conditions to determine differences, if any, between the two patterns, such differences being indicative of a reduction in the stiffness and hence structural integrity of the structure due to weakening of the latter by fatigue damage, stress corrosion cracking and/or other causes.

Hung, et al., U.S. Pat. No. 4,139,302, Feb. 13, 1979, Method and Apparatus for Interferometric Deformation Analysis:

Discloses a method and apparatus for obtaining a photographic record of superimposed interference fringes arrayed as a function of the deformation which results in the object from an applied stress, which may be mechanical, thermal, or the like. The object is first illuminated with coherent light. The illuminated surface is then photographed with a camera having an optical wedge disposed over half of its lens to record two slightly displaced overlapping images of the object on the camera film. The object is then stressed by changing the ambient temperature or pressure or other mechanical loading, and the undeveloped film is exposed to a second set of overlapping images. The developed photograph contains a set of equal amplitude fringes representing the interference pattern between the two fringe sets generated by the two exposures and arrayed as a function of the strain in the object as a result of the stress. To render the fringe set visible, an image of the object is projected on a screen through a Fourier, fringe-frequency sensitive filter which enhances the fringe contrast on the resulting image of the object.

Grant, et al., U.S. Pat. No. 4,690,552, Sep. 1, 1987, Optical Method and Apparatus for Strain Analysis:

Discloses a system for measuring strains in a test object in any of a plurality of directions. The object is illuminated with coherent light so that light is reflected to a focussing lens and a shearing diffraction grating having lines extending in a plurality of directions. The various diffracted orders interfere at the focal plane of the lens and are recorded on a photographic media. The object is then stressed and a second exposure is made on the same media, resulting in interference between the fringes produced on the two exposures. The media is developed as a transparency and subjected to optical processing to detect strain in any direction.

Grant, et al., U.S. Pat. No. 4,702,594, Oct. 27, 1987, Double Exposure Interferometric Analysis of Structures and Employing Ambient Pressure Stressing:

Discloses a method for detecting subsurface defects in a vehicle tire in which the tire is placed in a sealed pressure chamber and the pressure is rapidly reduced to a very low level, and maintained at that level for a period of time. The body of the tire creeps for a period of time following the pressure change as a result of the stresses imposed by the pressure change. During this creep period a section on the surface of the tire is illuminated with coherent light and two separate exposures of interferograms are made using the reflected light and recorded on either a photographic media or the cathode of a television image tube. The exposure may either be holographic, in which case the interferogram is produced by using a reference beam of light derived from the same source that illuminates the object surface, or shearography, in which case two focused images of the tire surface section are formed on the photosensitive media, displaced with respect to one another and overlapping one another. The resultant hologram or shearogram is processed in the normal manner to derive an image of the object surface containing fringes arrayed as a function of the deformation of the surface between the two exposures. These fringes are analyzed either by a computer or an operator, to detect anomalous: fringe families related to subsurface defects in the tire section.

Morbieu, et al., U.S. Pat. No. 5,172,181, Dec. 15, 1992, Laser System for Measuring the Angle of Incidence of An Aircraft:

Discloses a system for measuring the angle of incidence of an aircraft, comprising at least one probe with a laser generator having a monochromatic emission spectral line, an optical emission system, an optical system receiving a monochromatic radiation back-scattered by the aerosols, means for pumping the laser generator, a detection interferometer receiving a part of the emitted laser beam and the back-scattered radiation and means for determining, after beating of the emitted beam and back-scattered beam, the Doppler frequency of the back-scattered beam and deriving therefrom the air speed along the axis of the emitted laser beam, in which system the optical emission system is adapted so as to focus the emitted beam on an air slice distant from the aircraft, the laser generator is disposed in the vicinity of the skin of the aircraft, the pumping means and the interferometer are moved inside the aircraft and the frequency of the laser spectral line is adapted so that the connections between the probe, on the one hand, and the pumping means and the interferometer, on the other, are made from monomode optical fibers with polarization maintenance.

All prior art optical diagnostic techniques used for wind tunnel measurements and similar remote measurement applications that the present inventors are familiar with have certain drawbacks. For example, virtually all prior art optical diagnostic techniques known to the present inventors are limited by poor optical access to desired measurement locations, and by the difficulty in performing multiple, simultaneous measurements of various surface and air flow parameters. In view of the limitations of prior art optical diagnostic techniques, the novel methods, articles and apparatus according to the present invention were conceived.

According to the present invention, holograms are recorded in place on a coating applied to an aerodynamic test surface, or pre-recorded on a thin film which is conformally adhered to a surface, thus forming a holographic optical element, or HOE. Diffraction of an optical beam off surfaces thus prepared, which surfaces may be referred to as "optically smart," provide information about surface characteristics such as temperature.

OBJECTS OF THE INVENTION

An object of the present invention is to provide a method and apparatus for remotely measuring physical characteristics of surfaces of objects by optical means.

Another object of the invention is to provide a method and apparatus for remotely measuring aerodynamic parameters in the vicinity of an object surface by means of an optical beam directed onto an optical sensor affixed to the surface of the object.

Another object of the invention is to provide a method and apparatus for remotely measuring aerodynamic parameters in the vicinity of an object surface by means of an optical beam directed onto a diffracting surface formed in the surface of an object.

Another object of the invention is to provide a method and apparatus for remotely measuring aerodynamic parameters in the vicinity of an object surface by reflecting an optical beam off the surface of a diffracting film on the object surface.

Another object of the invention is to provide a method and apparatus for remotely measuring aerodynamic parameters in the vicinity of an object surface by reflecting an optical beam off the surface of a thin diffraction grating on the object surface.

Another object of the invention is to provide a flexible diffraction grating adapted to be conformally fastened to an object surface, the grating being adapted to modulate an optical beam incident upon the grating with information indicating physical characteristics of the surface.

Another object of the invention is to provide a thin optical element conformable to an object surface, the optical element being adapted to modulate an optical beam incident upon the element with information signifying physical properties at and near the object surface.

Another object of the invention is to provide a holographic optical element conformable to an object surface and addressable by an optical beam to yield information about physical parameters of the object surface and of regions of space near to the surface.

Various other objects and advantages of the present invention, and its most novel features, will become apparent to those skilled in the art by perusing the accompanying specification, drawings and claims.

It is to be understood that although the invention disclosed herein is fully capable of achieving the objects and providing the advantages described, the characteristics of the invention described herein are merely illustrative of the preferred embodiments. Accordingly, we do not intend that the scope of our exclusive rights and privileges in the invention be limited to details of the embodiments described. We do intend that equivalents, adaptations and modifications of the invention reasonably inferable from the description contained herein be included within the scope of the invention as defined by the appended claims.

SUMMARY OF THE INVENTION

Briefly stated, the present invention comprehends improved methods, apparatus and articles for remotely measuring on or near an aerodynamic surface of an aircraft, missile, or wind tunnel model., such physical parameters as temperature, strain, air flow velocity and boundary layer transitions. According to the present invention, thin holographic optical elements are formed directly on the surface of an aerodynamic test object, or formed separately and adhered conformally to the object surface. Thus, in one embodiment of the invention, a photosensitive holographic recording medium is applied conformally to an object surface, and a holographic image recorded in the medium. In another embodiment, a holographic image is formed on the surface of a thin flexible sheet, which is then conformally adhered to an object surface.

Various holographic images are recorded on the surface or sheet, depending on the parameter or parameters to be measured. Thus, a one dimensional holographic diffraction grating may be used to measure uniaxial stress or temperature increase. A second holographic grating perpendicular to the first may be recorded on the same holographic optical element, and used to measure biaxial stress and/or temperature variations of surface.

According to the present invention, holographic optical elements conformally affixed to an object surface are illuminated by one or more collimated, coherent optical beams, preferably emitted by a laser. Depending upon the holographic image recorded on the holographic optical element, optical energy diffracted or reflected from the element may by detected by a photodetector and electronically analyzed to yield accurate remote measurements of surface temperature, strain, air flow velocity or boundary layer transitions in the vicinity of the surface.

BRIEF DESCRIPTION OF THE DRAWINGS

FIG. 4d is a schematic view showing how two address beams may be used to sample an air volume displaced from the surface of the sensor of FIG. 4a.

FIG. 5b is a diagrammatic view showing the geometrical arrangement for addressing a holographic optical element of the type shown in FIG. 5a.

FIG. 20c is a schematic view showing the method of addressing the LDV holographic element of FIG. 20a.

FIG. 20d is a view showing an alternate way of addressing the LDV holographic element of FIG. 20a.

FIG. 23b is a schematic view of optical beams of the apparatus of FIG. 20a.

FIG. 29b is an expanded time scale plot of the same data shown in FIG. 29a.

FIG. 33b is a pictorial view of an interference fringe pattern obtained with the apparatus of FIG. 33a.

DETAILED DESCRIPTION OF THE INVENTION

A. Overview of Basic Embodiments of the Invention

Figure 1:
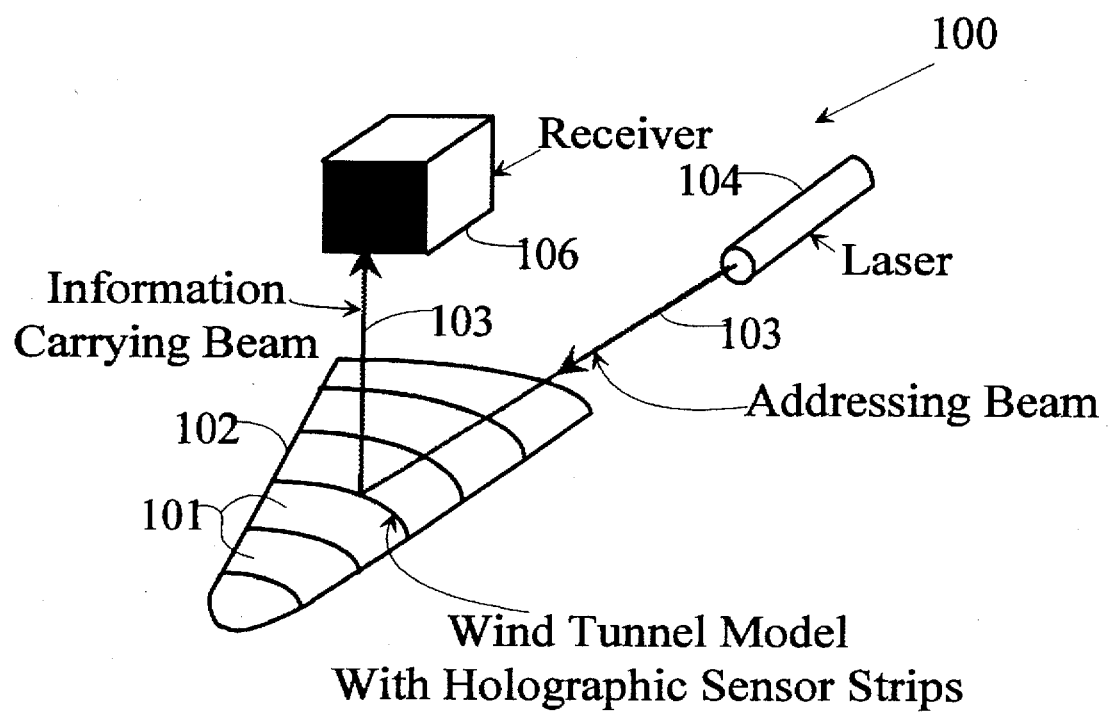
FIG. 1 is a schematic view of a measurement apparatus according to the present invention.

FIG. 1 is a schematic view of a basic embodiment of measurement apparatus 100 according to the present invention, in which specially constructed diffracting sensor strips 101 are adhered to or formed in place on the surface of a test object such as the model of an aircraft wing 102. An optical beam 103, preferably from a laser 104 is diffracted off sensor strips 101. The diffracted beam 105 is collected by an optical receiver 106. Receiver 106 includes one or more photodetectors and signal processing electronics which analyze changes in fringe patterns produced by sensor strips 101, thus providing information regarding temperature, strain and other parameters of wing 102, and of sample volumes of air near the surface of the wing.

Sensor strips 101 shown in FIG. 1 are thin, holographic diffraction gratings that are alternatively formed in a photosensitive material applied to the surface of a test object, etched into the surface, or recorded on thin, flexible film which is attached to the surface. Sensor strips 101 are referred to herein as holographic optical elements (HOE's). Since addressing strips 101 with a laser beam yields information about physical parameters of the surface, surfaces thus prepared are referred to as "optically smart" surfaces.

Figure 2A:
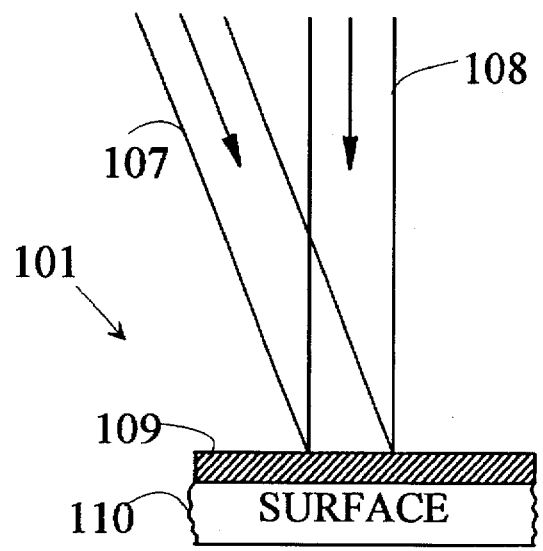
FIG. 2a is a diagrammatic view of a method for constructing holographic sensors according to the present invention.
Figure 2B:
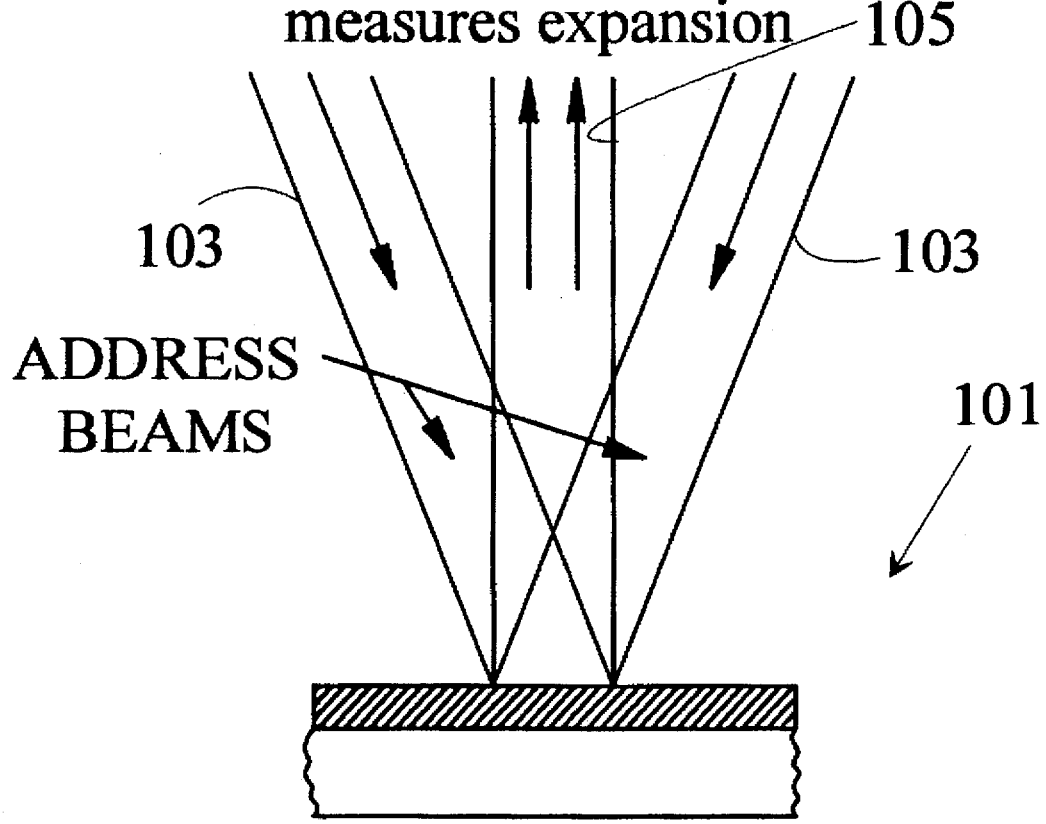
FIG. 2b is a diagrammatic view of a method for addressing a holographic sensor according to the present invention, to measure characteristics of a surface to which the sensor is attached.

FIG. 2 illustrates in a general diagrammatic way how holographic sensor strips according to the present invention are fabricated. As shown in FIG. 2a, a reference beam 107 and an object beam 108, both derived from a common source of coherent optical radiation, impinge on a photosensitive layer 109 applied to a surface 110. The reference and object beams are so arranged as to produce a holographic diffraction grating in layer 109, thus forming a sensor 101. When, as shown in FIG. 2b, one or more coherent address beams 103 impinge upon sensor 101, a beam of light 105 is diffracted from the surface of the sensor. By recording a grating in sensor strips 101, local expansion or distortion of surface 110 causes the diffracted beam to become phase modulated. The resulting change in fringe patterns received by receiver 106 permits small expansions of the surface to be measured with extremely high sensitivity.

Figure 3A:
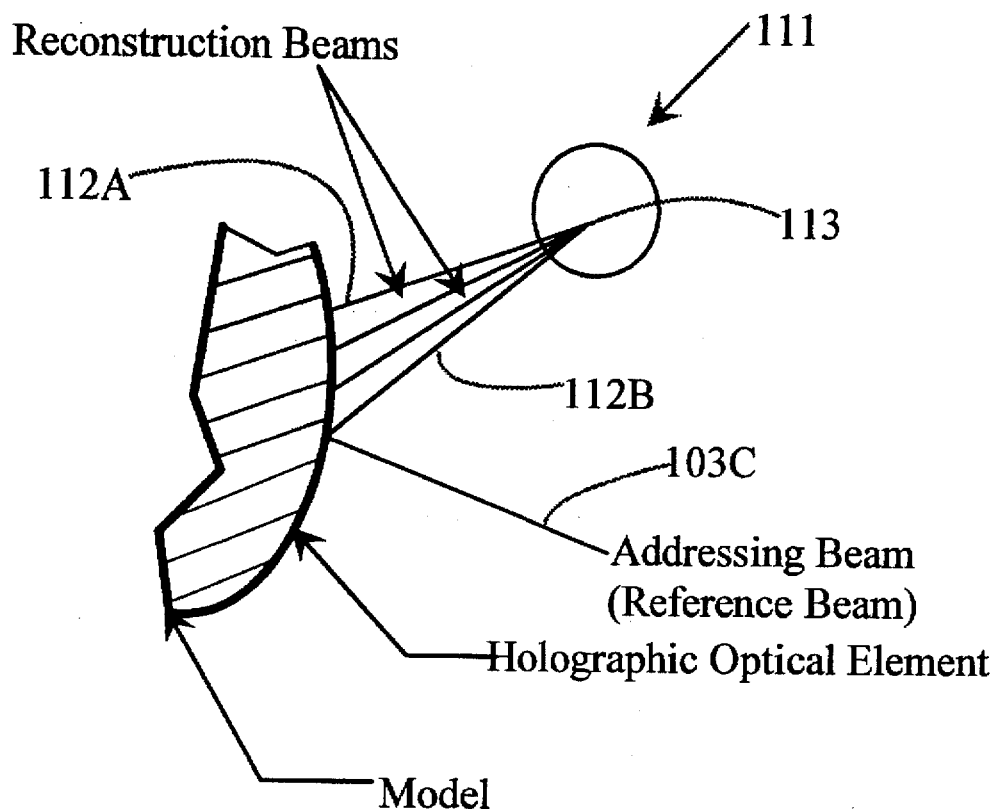
FIG. 3a is a diagrammatic view of a method of performing Laser Doppler Velocity (LDV) measurements according to the present invention.
Figure 3B:
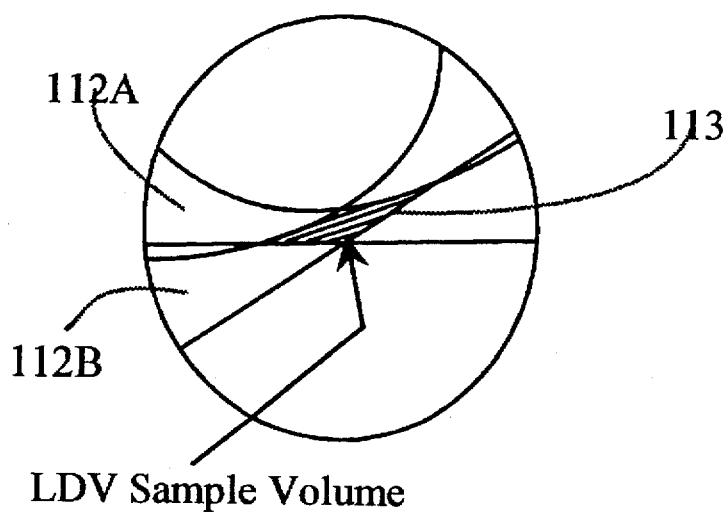
FIG. 3b is a magnified view of a volume sampled by the method of FIG. 3b.

FIG. 3 illustrates a holographic velocity sensor 111 in which an incident address beam 103C' is converted into two focused, intersecting beams 112a and 112b that create a fringe Laser Doppler Velocimeter sample 113 at a location near the model, as shown in FIG. 3b. Similar sample volumes can be created near the model and at multiple locations, by recording appropriate holograms in sensor strips 101.

Figure 3C:
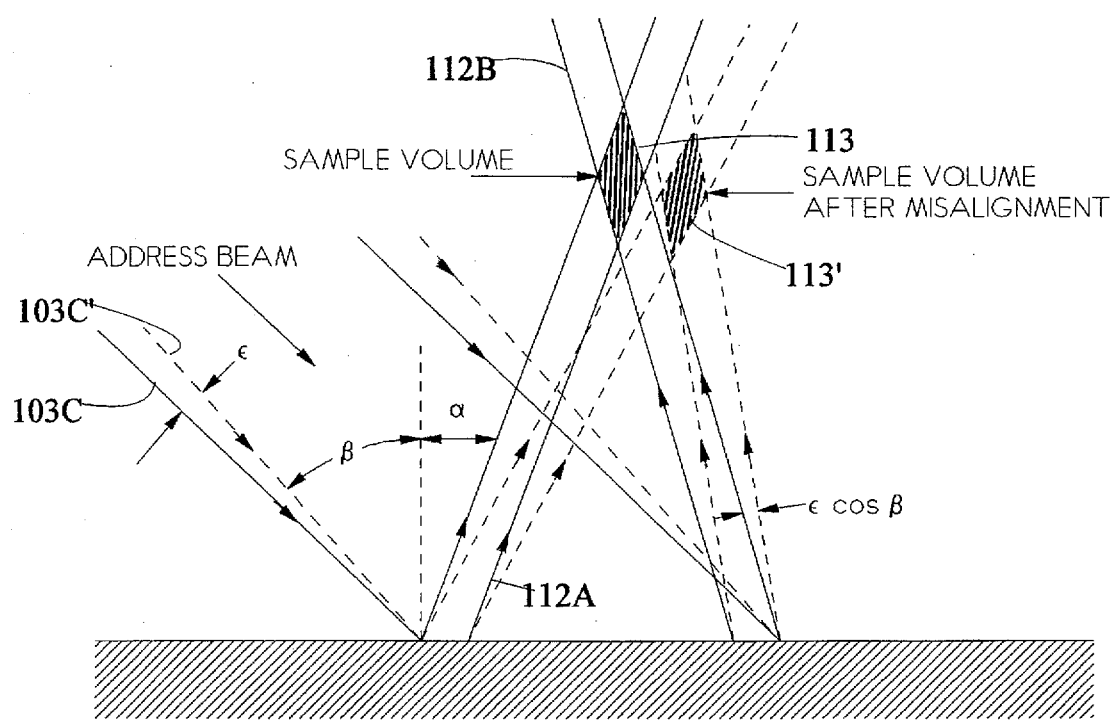
FIG. 3c is a more detailed view of the geometry of a Laser Doppler Velocimeter according to the present invention, showing errors caused by misalignment.

FIG. 3c shows the displacement in sample volume caused by a slight angular misalignment of address beam 103C to the position of beam 103C'.

FIG. 4 illustrates other basic embodiments of holographic sensors according to the present invention. Referring first to FIG. 4a, a sensor 114 is formed by irradiating a photosensitive layer 115 with a reference beam $U_1$ (116) and a collimated object beam $U_2$ (117), thus forming a HOE consisting of a hologram of a collimated beam. Referring now to FIG. 4b, when HOE 114 is illuminated by address beam $U_3$ (117) directed normal to the surface of the HOE, a pair of diffracted beams $U_4^{1R}$ (118) are $U_4^{2R}$ (119) forms a volume region 120 containing interference fringes near the HOE. As was previously stated, light scattered off of particles in volume region 120 may be analyzed to yield the Laser Doppler Velocity of air or other gasses flowing through the sample volume.

Figure 4A:
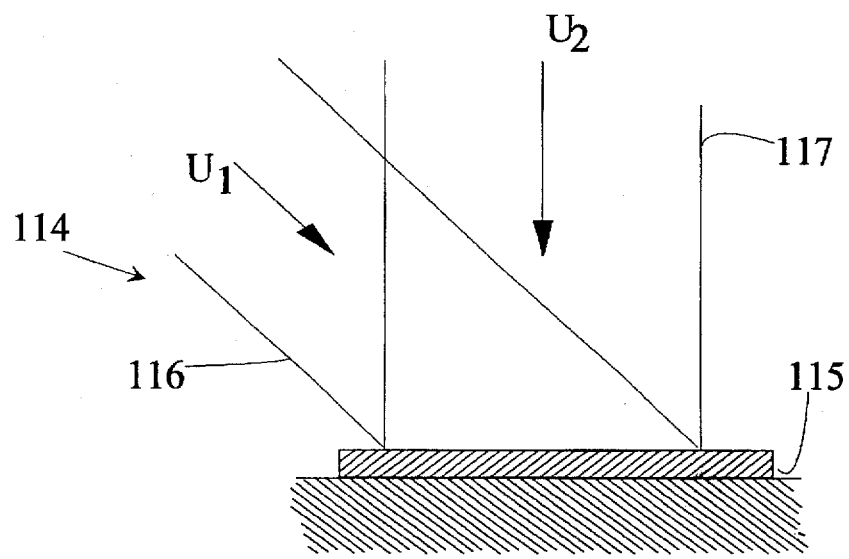
FIG. 4a is another schematic view showing how holographic sensors are constructed according to the present invention.
Figure 4B:
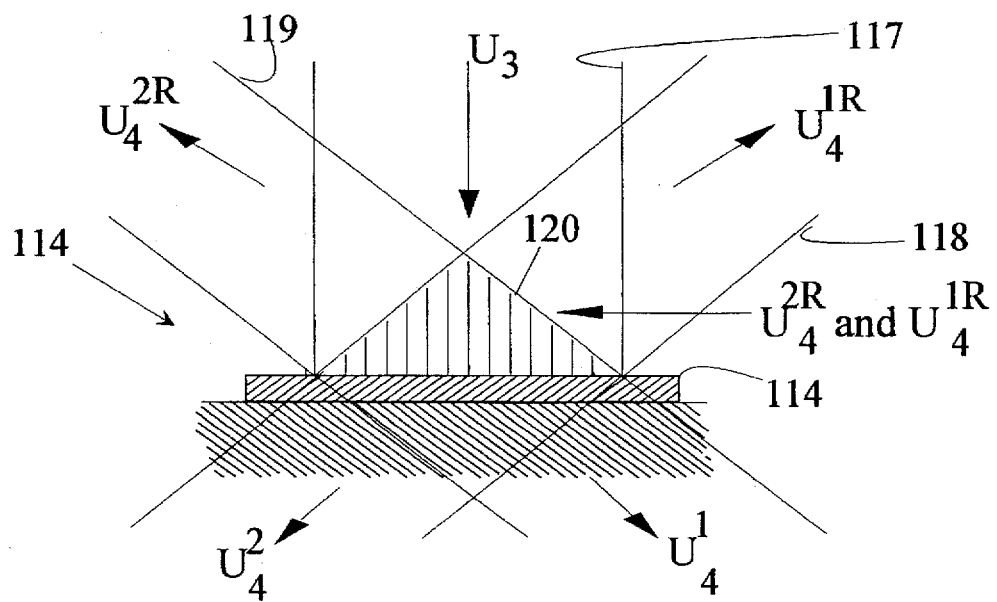
FIG. 4b is a schematic view showing the formation of fringes caused by addressing the sensor of FIG. 4a with a collimated optical beam normal to the sample.
Figure 4C:
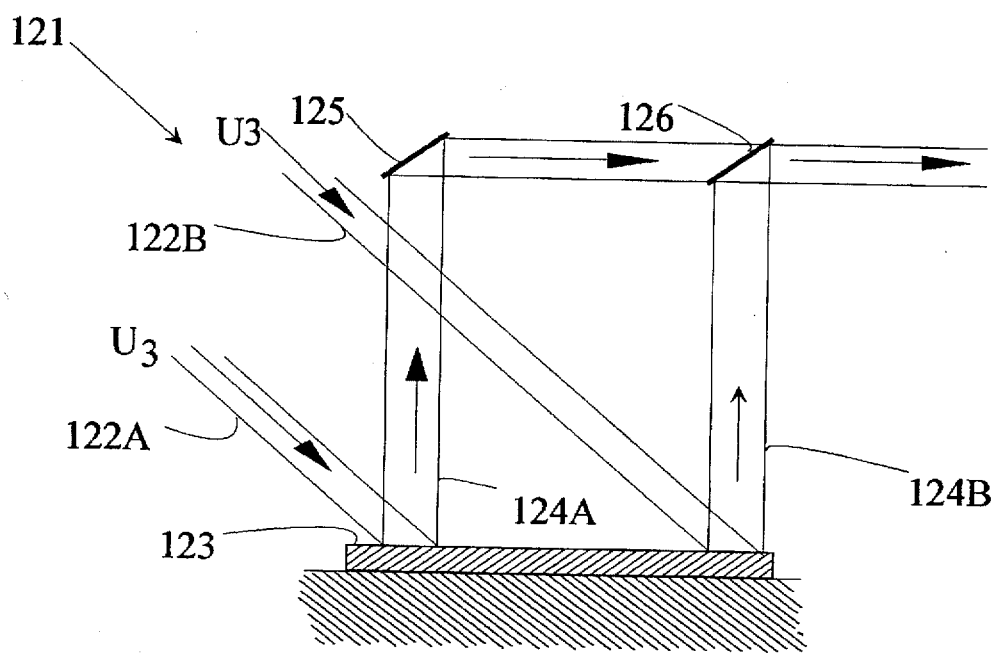
FIG. 4c is a schematic view showing how two address beams may be used with the sensor of FIG. 4a to measure surface gradients.

FIG. 4c illustrates another embodiment 121 of a holographic sensor apparatus according to the present invention. In this embodiment, a pair of parallel beams $U_{3a}$ and $U_{3b}$ (122a and 122b) is directed obliquely onto the surface of HOE sensor 123. Incident beams 122a and 122b are diffracted into beams $U_{4a}$ and $U_{4b}$ (124a and 124b) respectively, which are parallel to one another and perpendicular to the surface of sensor 123. Beam 124a is reflected off the surface of diagonal mirror 125 onto the back surface of a partially transmitting diagonal mirror 126. Beam 124b is reflected off the front surface of partially transmitting diagonal mirror 126, where it is combined with beam 124a. A photodetector (not shown) detects phase differences between the combined beams. Thus, apparatus 121 functions as an interferometer which permits measurement of the optical path difference between two locations on the surface of sensor 123 illuminated by beams 122a and 122b. This path difference measurement provides a sensitive measure of density gradients along the surface, and may be used for locating boundary layer transitions.

Figure 4D:
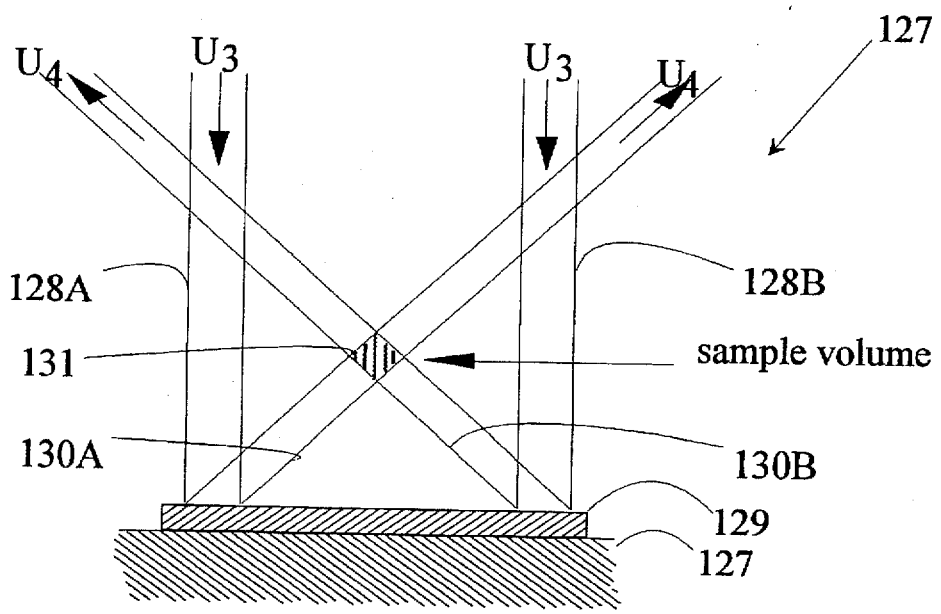

FIG. 4d illustrates another embodiment 127 of a measurement apparatus according to the present invention. In this embodiment, a pair of parallel address beams $U_{3a}$ and $U_{3b}$ (128a and 128b) that are normally incident upon the surface of a sensor 129 produce beams $U_{4a}$ and $U_{4b}$ (130a and 130b) respectively, which are diffracted obliquely from the sensor surface and produce interference fringes in a sample volume 131 spaced above the surface.

B. Theoretical Basis of the Invention

Having reviewed the foregoing description of basic embodiments of the invention, a better understanding of a more detailed description of the preferred embodiments may be facilitated by reviewing the theoretical basis of the invention.

Figure 5A:
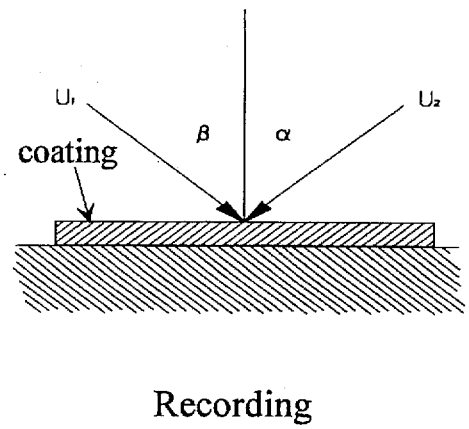
FIG. 5a is a diagrammatic view showing the geometrical arrangement for recording a holographic optical element according to the present invention.
Figure 5B:
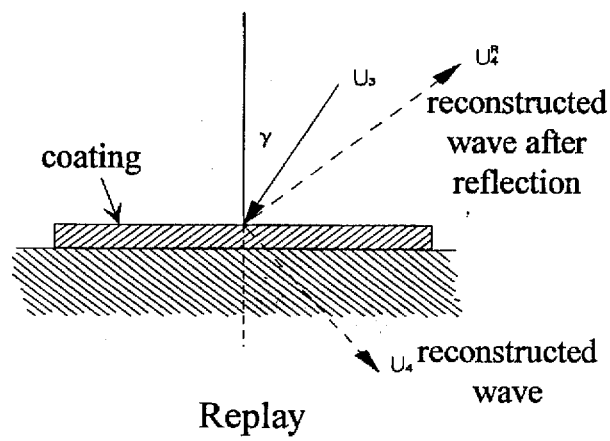

Referring now to FIG. 5, equations to predict the amplitude, phase, and direction of a beam of light returned from a holographic surface are derived, considering a variation in only one dimension. FIG. 5 illustrates the geometry and the definition of terms and components involved. For the construction of the hologram, two mutually coherent light waves intersect on a general surface of arbitrary shape. This shape could, for example, represent a sensor located on a model surface. The amplitude of the waveform at the surface can be written as the sum of two coherent light waves having amplitudes $U_1$ and $U_2$.

$$U(x) = U_1 + U_2 \tag{1}$$

where $U_1$ and $U_2$ can be thought of as an object wave and reference wave respectively and x is the distance in one axis of the hologram.

The resulting waveform has an intensity given by:

$$I(x) = UU^* \quad (2)$$
$$= |U_1|^2 + |U_2|^2 + U_1U_2^* + U_1^*U_2$$

where * denotes the complex conjugate, and | | denotes the absolute value.

After processing, we assume that the transmissivity of the hologram is proportional to the original exposure so that upon illumination from an address beam the reflected beam has the form.

$$U_4 = HI(x)U_3 \quad (3)$$

where $U_3$ is the address beam, $U_4$ is the reconstructed beam and H is a constant.

$$U_4 = DU_3 + HU_1U_2^*U_3 + HU_1^*U_2U_3 \quad (4)$$

Where $D = H(|U_1|^2 + |U_2|^2)$

Notice that the second term in equation (4) is proportional to the original object wave, $U_1$, used to form the hologram. The wave represented by the third term is its conjugate. Either of the two waves contains all of the information of the original object wave. Therefore, whatever the original wave is, whether it be a simple plane wave or a combination of many waves, it can be synthesized by addressing the hologram. Also note that the behavior of the reconstructed wave is independent of the shape of the surface, since the only variable, x is assumed to lie in the surface, and no assumption has yet been made about the shape of the surface. This provides the first step required for modeling holographic sensors in the ideal case.

Holographic Sensor Equations

Referring again to FIG. 5, and assuming the incident plane waves can be written as, $$U_1 = A \exp(ikx \sin \beta)$$
$$U_2 = B \exp(ikx \sin \alpha)$$
$$U_3 = C \exp(ikx \sin \gamma) \quad (5)$$

substituting into equation 4 we find that, $$U_4 = DU_3 + E \exp(ikx(\sin \beta - \sin \alpha + \sin \gamma)) + E \exp(ikx(-\sin \beta + \sin \alpha + \sin \gamma)) \quad (6)$$

Where $k = 2\pi/\lambda$, and $E = ABCH$.

With this generalized equation for a reflected wave it is possible to describe an emerging signal beam's intensity as a function of position for different sensor geometries and investigate its sensitivity to various parameters.

Temperature/Strain Sensor Equation

FIG. 2 shows one geometry for recording and playback of the temperature/strain sensor. For playback, two beams are incident on the hologram from opposed oblique directions and their mutual interference forms the third signal beam. Using equation equations for the intensity of the combined reflected beam as a function of thermal expansion and strain were derived. The intensity at the edge of the sensor is given by, $$I = 4E^2 \cos^2((2\pi r/\lambda)(\sin \beta)(K\Delta T)/(1+K\alpha T)) \quad (7)$$

Where K is the thermal expansion coefficient, $\Delta T$ is the change in temperature and r is the sensor radius. The temperature change required to produce one half fringe shift is, $$\Delta T_{(I=0, x=r)} = \lambda/4rK\beta \quad (8)$$

The corresponding equations for strain measurement are,
$$I = 4E^2 \cos^2((2\pi r/\lambda)(\sin \beta)(YS)/(1+YS)S)_{I=0, x=r} = \lambda/4rY\beta + tm \quad (9)$$

where S is the stress and Y is the stress/strain coefficient of the sensor material.

The sensitivity of the measurements can be increased (decreased) by, (1) Choosing a material for the sensor having large (small) coefficients K or Y.

(2) Making $\beta$ larger (smaller).

In addition, it was shown that the strain/temperature gauge is not sensitive to vibration, provided the reconstructing beam is a replica of the recording reference wave.

Laser Velocimeter Sensor

The Laser Doppler Velocimeter (LDV) measures flow velocity by detecting the frequency of scattered light amplitude from particles that cross a spatial grating formed by two overlapping beams. FIGS. 3 and 4 shows the geometry and beam designations for the LDV. Here, two holograms are recorded with identical reference beams so that when played back the two reconstructed beams cross over each other to form a sample volume with fringes. Analytically, the two reconstructed beams, $U_4$ and $U_4'$, have phase terms that are equal and opposite. If we assume that, $$\gamma = \beta + \epsilon,$$

so that the address beam is the same as the writing beam plus a small deviation $\epsilon$, it is possible to analyze the effect of tilt and vibration. Setting, $$\alpha = -\alpha'$$
$$\beta = \beta'$$

will produce two beams that cross in space. The reconstructed waves can be written as, $$U_4 = DU_3 + E \exp(ikx(\sin \beta - \sin \alpha + \sin (\beta + \epsilon)) + E \exp(ikx(-\sin \beta + \sin \alpha + \sin (b + \epsilon))$$

$$U_4' = DU_3 + E \exp(ikx(\sin \beta + \sin \alpha + \sin (\beta + \epsilon)).$$

Note that if $\epsilon = 0$, then the second terms of $U_4$ and $U_4'$ become two waves traveling at $\pm \alpha$ with respect to the surface normal.

For small $\epsilon$ the combined intensity of the two beams is given by, $$|U_s|^2 = 2E^2 + 2E \cos(kx(\sin \alpha + \epsilon \beta + \sin \alpha - \epsilon \beta)) = 2E^2 + 2E \cos(2kx \sin \alpha)$$

Note that in this approximation, the sample volume is not affected by misalignment of the address beam. This is a consequence of the fact that an ε misalignment causes equal change in both beams.

C. Detailed Description of the Preferred Embodiments

Figure 6:
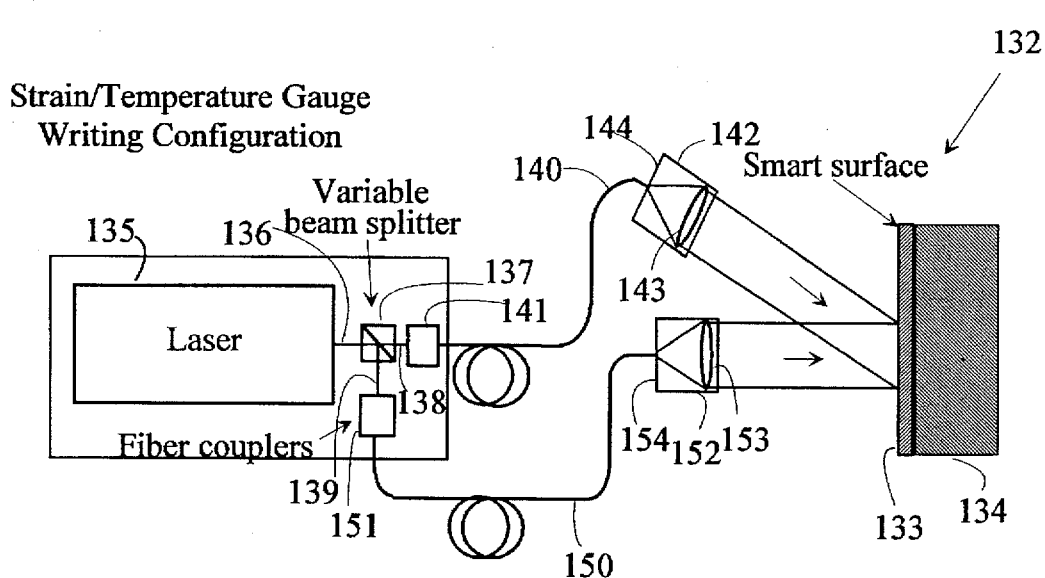
FIG. 6 is a schematic view showing an apparatus used to record a basic holographic optical element according to the present invention.

Referring now to FIG. 6, an apparatus and method for recording a holograph optical element (HOE) in a photosensitive film is shown. The arrangement shown is specifically intended for recording HOE's for use as strain/temperature gauges. However, as will become apparent from the discussion of other types of HOE's described below, recording other types of. HOE's is performed in a similar fashion.

As shown in FIG. 6, a strain/temperature gauge recording apparatus 132 according to the present invention is used to record a hologram in a photosensitive layer 133 on a substrate 134. Recording apparatus 132 includes a laser 135 having an output beam 136 incident upon a beam splitter 137 having a first, reference output beam 138, and a second, object output beam 139. Beam splitter 137 is of the variable type, allowing adjustment of the intensity of object beam 139 relative to that of reference beam 138. Reference beam 138 is conveyed to a first fiber optic cable 140 by means of a fiber optic coupler 141. The output of fiber optic cable 140 is connected to a polarization rotating fiber holder 142 and lens 143 which together comprise collimating optics 144 for the reference wave.

Similarly, object beam 139 is conveyed to a second fiber optic cable 150 by means of a fiber optic coupler 151. The output of fiber optic cable 150 is connected to a polarization rotating fiber holder 152 and lens 153 which together comprise collimating optics 154 for the object wave. Strain/temperature gauge recording apparatus 132 is used to record a holographic diffraction grating in photosensitive layer 133. As will be made clear from the more detailed discussion below, single axis HOE's may be made having a single group of parallel lines, two-axis HOE's may be made having two groups of lines inclined to one another, multiple frequency HOE's having two gratings of different spatial frequencies, and HOE's containing one or more images of illuminated beams, converging or diverging, may also be made, depending upon the intended application for the HOE.

Figure 7:
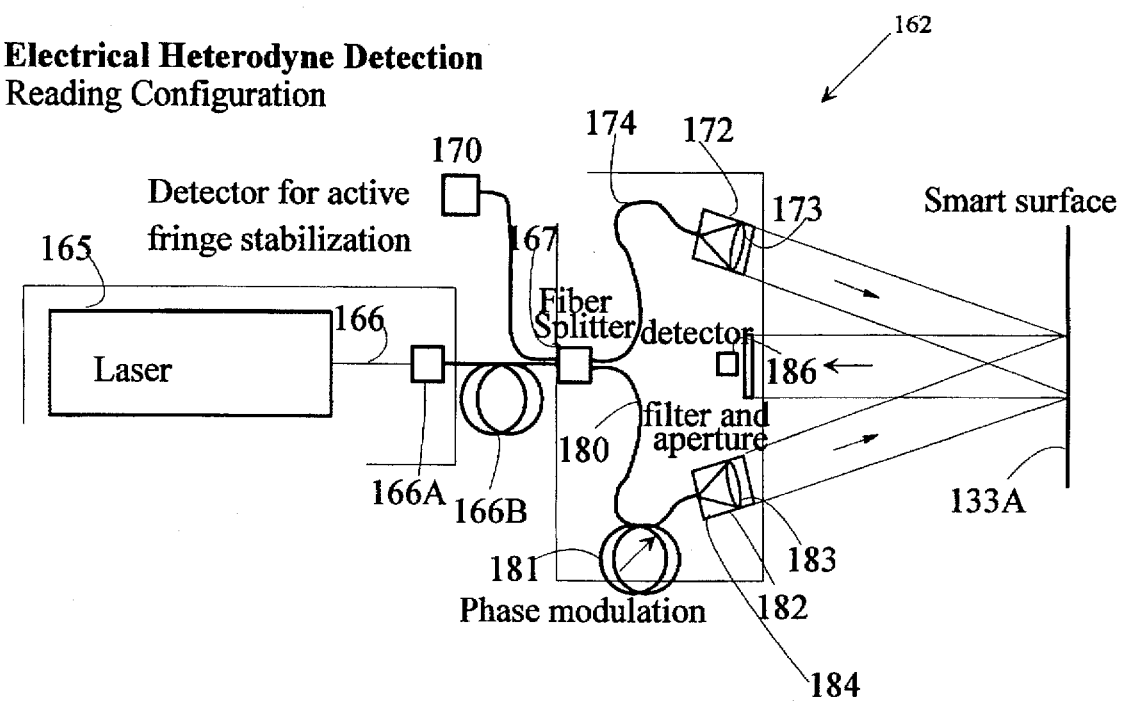
FIG. 7 is a schematic view showing an apparatus according to the present invention used to remotely measure strain using a holographic optical element using a fiber optic delivery system.

FIG. 7 illustrates a method and apparatus 162 for remotely measuring strain and/or temperature of an object surface on which an HOE is recorded directly on the surface as shown in FIG. 6 and described above, or recorded on a thin sheet which is subsequently adhered to an object surface. The strain/temperature reconstruction apparatus shown in FIG. 7 includes a laser 165 having an output beam 166 coupled by optical fiber coupler 166A to the input of a first coupling optical fiber 166B. The output of first coupling optical fiber 166B is connected to the input of a fiber beam splitter 167. The input of a first address optical fiber 170 is connected to the first output terminal of fiber beam splitter 167. The output of first address optical fiber 170 is connected to a polarization rotating fiber holder 172 and lens 173 which together comprise collimating optics 174 for illuminating with a first address optical beam HOE 133A on the surface of a remotely located test object.

Strain/temperature reconstruction apparatus 162 also includes a second address optical fiber 180 having an input terminal connected to a second output terminal of fiber beam splitter 167. The output terminal of second address optical fiber 180 is connected to a polarization rotating fiber holder 182 and lens 183 which together comprise collimating optics 184 for illuminating with a second address optical beam HOE 133A on the surface of a remotely located test object.

For playback, the object beam is not needed but the reference beams remain unchanged. To achieve greater sensitivity in measuring small phase changes in the returning signal beam (caused by small changes in the sensor), either a phase stepping technique (shown here using a direct piezoelectric phase modulation of optical signals transmitted by the fiber), or a heterodyning technique (which involves replacing the phase modulator with an acousto-optic frequency shifting device), may be used. Because the amplitude of the returning light signal for this sensor is substantial, the detector comprises a standard silicon photodiode 186, pinhole and an interference filter tuned at a bandpass for 442 nm. The filter is used to avoid saturation of the detector due to ambient lighting.

Figure 8:
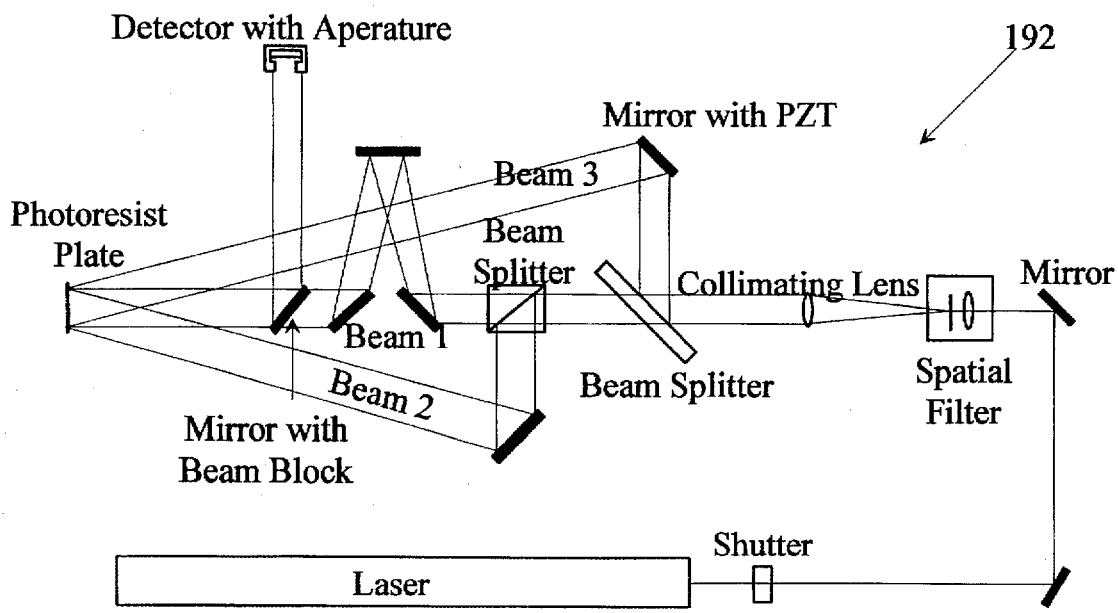
FIG. 8 is a more detailed schematic view of an apparatus similar to the apparatus shown in FIG. 7, which is also used to record holograms and perform strain measurements but which does not use fiber optics.

FIG. 8 illustrates a modified strain/temperature sensor recording and reconstruction apparatus 192 that was constructed to validate the conceptual design of strain/temperature reconstruction apparatus 162 shown in FIG. 7 and described above.

As shown in FIG. 8, strain/temperature sensor recording/reconstruction apparatus 192 includes a laser 195 that is used first to record a strain/temperature sensor holographic grating in photosensitive layer 193 on a substrate 194. For recording, output beam 186 of laser 195 passes through a beam splitter plate 197B to a beam splitter cube 197 where it is split into a reference beam 198 and object beam 199. Reference beam 198 is reflected off a diagonal relay mirror 198A onto photosensitive layer 193. Object beam 199 is reflected off a pair of diagonal relay mirrors 199A and 199B and is normally incident upon photosensitive layer 193, when a return relay mirror/beam block 199C is pivoted out of the blocking position shown in FIG. 8.

During reconstruction or playback, relay mirror/beam block 199B is positioned as shown in FIG. 8, blocking object beam 199 from reaching photosensitive layer 193. For reconstruction, beam 198 is utilized as a first address beam. A second address beam 200 is formed by reflecting incident laser beam 196 off the backside of beam splitter plate 197B and a piezoelectrically (PZT) driven relay mirror 201. When illuminated with first and second address beams 198 and 200, the holographic grating 193A previously recorded in photosensitive layer 193 produces a diffracted image beam 202. Image beam 202 is reflected off the front side of diagonal relay mirror/beam block 199B onto photodetector 206.

Figure 9A:
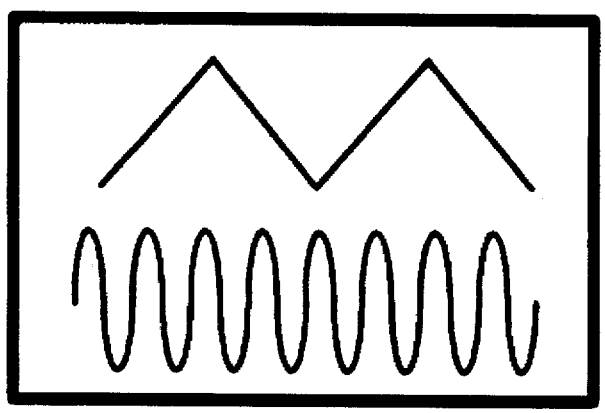
FIG. 9a is a pictorial view of the waveforms of certain signals of the apparatus of FIG. 8, with a surface bearing a holographic optical element at room temperature.
Figure 9B:
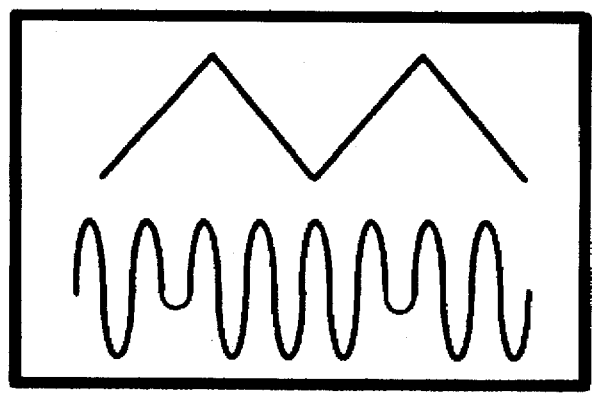
FIG. 9b is a pictorial view similar to that of FIG. 9a, but with surface at a temperature elevated above ambient.

PZT mirror 201 was utilized in strain/temperature sensor reconstruction apparatus 192 to allow heterodyne signal analysis. The angle of PZT mirror 201 was adjusted for an infinite fringe condition, i.e., parallel collimated beams, and photodetector 206 with a one millimeter aperture plate positioned in front of the detector was placed in the center of the fringe pattern produced by first and second address beams 198 and 200 incident upon surface 193. PZT mirror 201 was driven with a triangular wave from a function generator at an amplitude sufficient to cause up to four cycles of phase shift to appear on the detector, as shown in the oscillograms of FIG. 9A. Holographic sensor 193A was then heated, causing an additional phase shift of the detector signal, as shown in FIG. 9B. With the unassisted eye, a phase shift of about 1/10th of a fringe could be observed. With more sophisticated instrumentation such as heterodyne phase detectors, it is anticipated that phase shifts of as small as 1/100th of a fringe may be observed.

Figure 10:
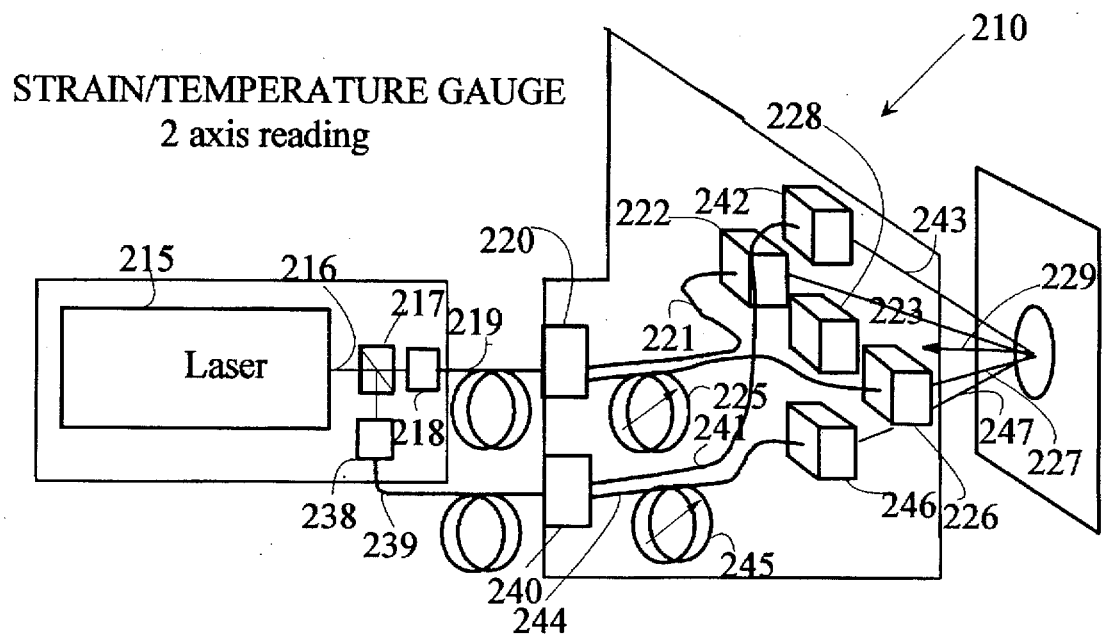
FIG. 10 is a schematic view showing an apparatus according to the present invention for remotely measuring strain and/or temperature rise of a surface provided with a holographic optical element.

FIG. 10 illustrates a modification of the strain/temperature reconstruction apparatus 162 shown in FIG. 7 and described above. The apparatus 210 shown in FIG. 10 utilizes a holographic element 211 in which are recorded two orthogonal gratings. A unique advantage of the holographic optical sensors according to the present invention is the capability that they afford to record two strain gauges in orthogonal directions to one another in order to resolve two in-plane components of shear stress. This resolution allows separation of strain and temperature signals: in a surface to which the sensor is attached, since temperature changes cause uniform expansion or contraction of the surface, while strain causes compression in one axis and expansion in the orthogonal axis.

In recording a two-axis holographic sensor 211, a first holographic grating is recorded in a photosensitive layer for an exposure time of approximately ½ to ⅔ the exposure time used in recording a single axis sensor. The sensor is then rotated 90 degrees about the optical axis, and a second holographic grating perpendicular to the first formed by exposing the photosensitive layer to coherent reference and object beams for ½ to ⅓ the exposure time used in a single axis recording.

Referring again to FIG. 10, the two-axis strain/ temperature reconstruction apparatus 210 according to the present invention may be seen to include a laser 215 having an output beam 216 incident upon a variable beam splitter 217. Beam splitter 217 has a first, X-source, output beam coupled to a first optical fiber 219 by means of a first fiber optic coupler 218. The output terminal of first optical fiber 219 is coupled to a first fiber optic splitter 220. First fiber optic splitter 220 has a first output terminal coupled to a first, X1 fiber 221. The output terminal of X1 fiber 221 is coupled to a first, X1 collimating optical assembly 222, which produces a first collimated X1 reference beam 223 incident upon 2-AXIS HOE 211.

First fiber optic splitter 220 also has a second output terminal coupled to a second, X2 fiber 224. The output terminal of X2 fiber 224 is coupled, preferably through a phase modulator 225, to a second, X2 collimating optical assembly 226, which produces a second collimated X2 reference beam 227 incident upon 2-AXIS HOE 211.

Apparatus 210 includes a photodetector 228 positioned so as to receive an image beam 229 formed by X1 beam 223 and X2 beam 227 incident upon HOE 11. Thus, apparatus 210, as described so far, functions as a single axis strain sensor apparatus as shown in FIGS. 7 and 8 and described above. Apparatus 210 also includes a second, Y-axis strain sensor, and means for distinguishing between strains along the X and Y axes of HOE 211, as will now be described.

As shown in FIG. 10, optical fiber beam splitter 217 has a second, Y-source, output beam coupled to second optical fiber 239 by means of a second fiber optic coupler 238. The output terminal of second optical fiber 239 is coupled to a second fiber optic splitter 240. Second fiber optic splitter 240 has a first output terminal connected to a first, Y1 fiber 241. The output terminal of Y1 fiber 241 is coupled to a first, Y1 collimating optical assembly 242, which produces a first collimated Y1 reference beam 243 incident upon 2-AXIS HOE 211.

Second fiber optic splitter 240 also has a second output terminal coupled to second, Y2 fiber 244. The output terminal of Y2 fiber 244 is coupled, preferably through a phase modulator 245, to a second, Y2 collimating optical assembly 246, which produces a second collimated Y2 reference beam 247 incident upon 2-AXIS HOE 211. Thus, apparatus 210 includes a second, Y-axis strain sensor apparatus in addition to the X-axis apparatus described above.

Since both X-axis and Y-axis fringe patterns of apparatus 210 are incident upon a common photodetector 228, the apparatus includes means for resolving X-axis strains from Y-axis strains. One means for performing this resolution, shown in FIG. 10, consists of phase modulating the X and Y address beams at different frequencies, by means of acoustic optic, electro-optic, or piezo-electric phase modulators 225 and 245. Alternatively, X and Y address beams may be polarized orthogonally to one another, and a polarizing beam splitter used to direct orthogonally polarized image beams different from the surfaces of HOE 211 to a pair of separate, X and Y photodetectors.

Figure 11:
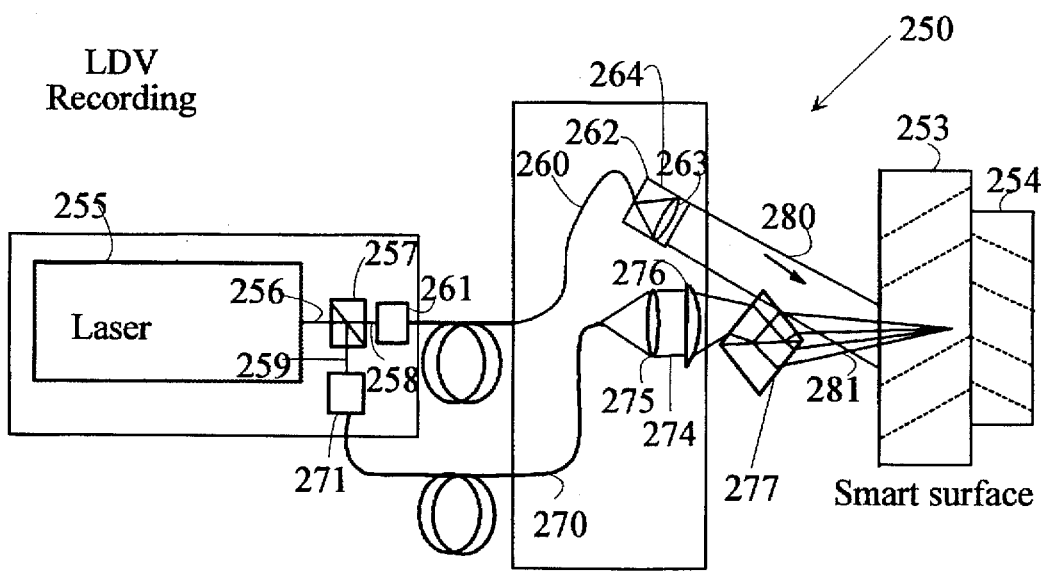
FIG. 11 is a schematic view of an apparatus according to the present invention used to record a holographic optical element for use in a Laser Doppler Velocimeter (LDV) using a fiber optic delivery system.

FIG. 11 illustrates an apparatus 250 for recording a smart optical surface on HOE 253A to be used for performing Laser Doppler Velocity (LDV) measurements. The function of LDV recording apparatus 250 is similar to that of the basic strain gauge hologram recording apparatus 132 shown in FIG. 6 and described above. Thus, laser 255 in FIG. 11 corresponds to laser 135 in FIG. 6, and other corresponding elements having element numbers displaced upwards by 120 performing the same functions as the corresponding elements in FIG. 6, and for that reason, need not be described again. The function of apparatus 250 shown in FIG. 11 is to produce a plane reference wave 280 which is incident upon a photosensitive layer 253 on a substrate 254. Apparatus 250 also produces an object wave 281 which impinges on photosensitive layer 253 and interferes with reference plane wave beam 280 to produce a holographic grating. However, in the case of LDV recording apparatus 280 shown in FIG. 11, object beam optical assembly 274 utilizes lens 275 and 276 to produce a focused optical beam, rather than a collimated beam. This beam is focused inside photosensitive layer 253, and produces a hologram which causes an image beam having a small volume of the type shown in FIGS. 3B and 3C to be formed when the hologram is illuminated by address beams. Preferably, LDV recording apparatus 250 includes a beam splitting prism and cylindrical lens assembly 277 between focusing optical assembly 274 and photosensitive layer 253A. The function of assembly 277 is to cause a line rather than a point focus hologram to be formed in photosensitive layer 253A. The reason for forming a line image rather than a point image is because we have found that it is easier to produce a sharp line image in a sample volume than a sharp point image, since the latter requires that rays converge in two dimension rather than one.

Figure 12:
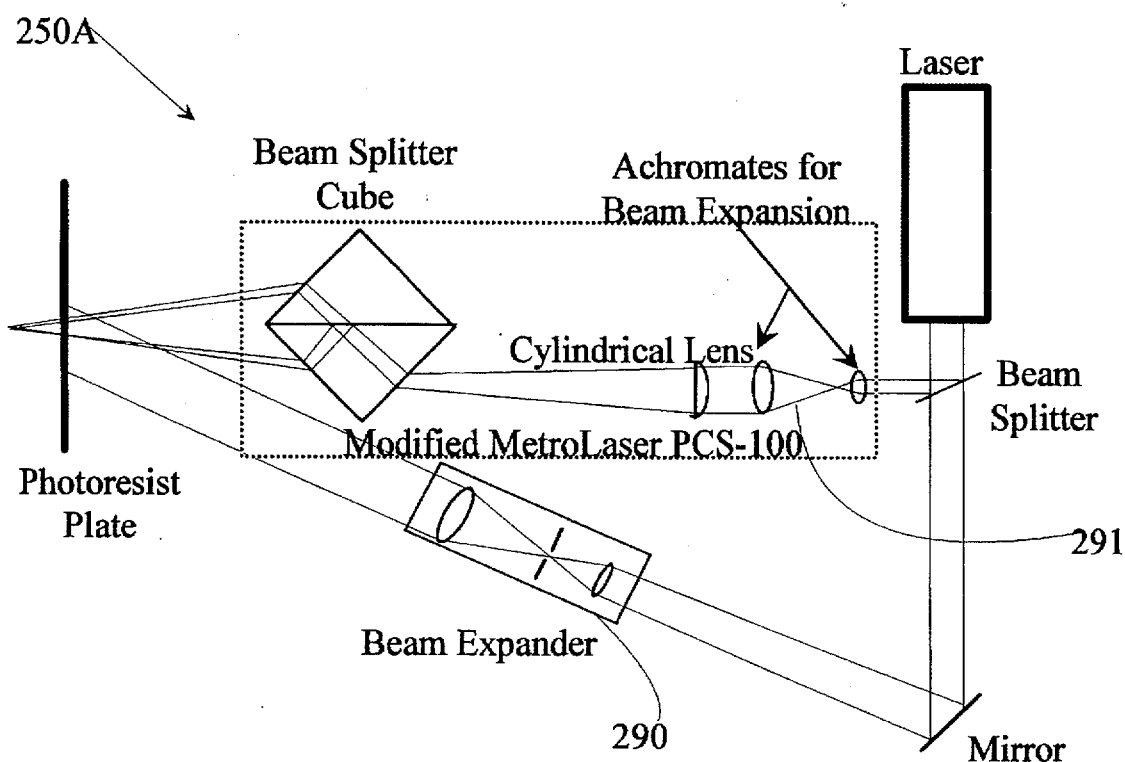
FIG. 12 is an apparatus similar to that of FIG. 11 but, which does not use fiber optics.

FIG. 12 shows a LDV recording apparatus 250A similar to that of FIG. 11, but not using fiber optics. Beam expander optics 264A and 274A are used in the paths of the reference and object beams, respectively.

Figure 13A:
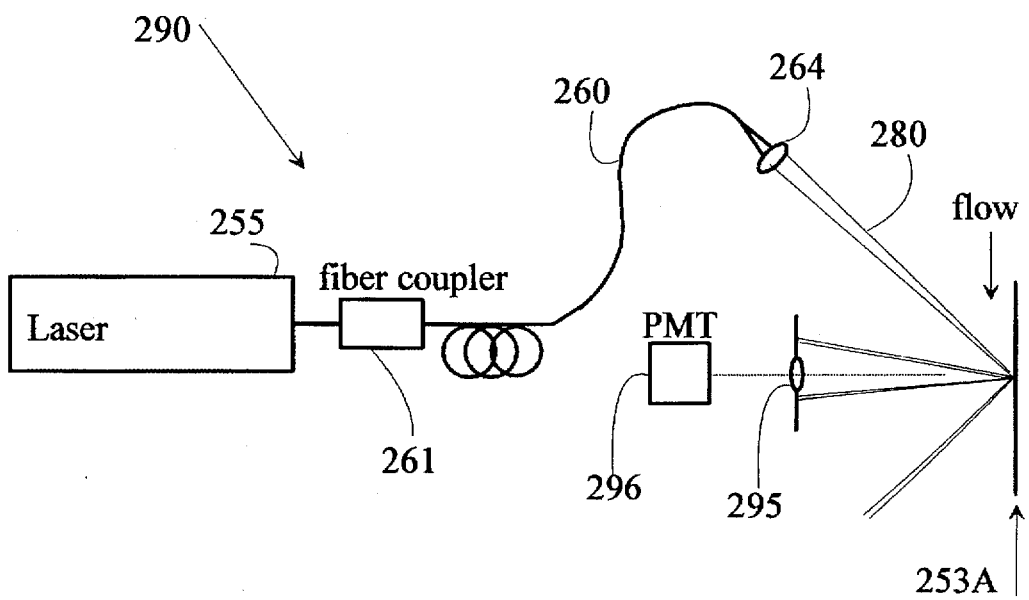
FIG. 13A is a schematic view showing an apparatus according to the present invention used to perform LDV measurements.
Figure 13B:
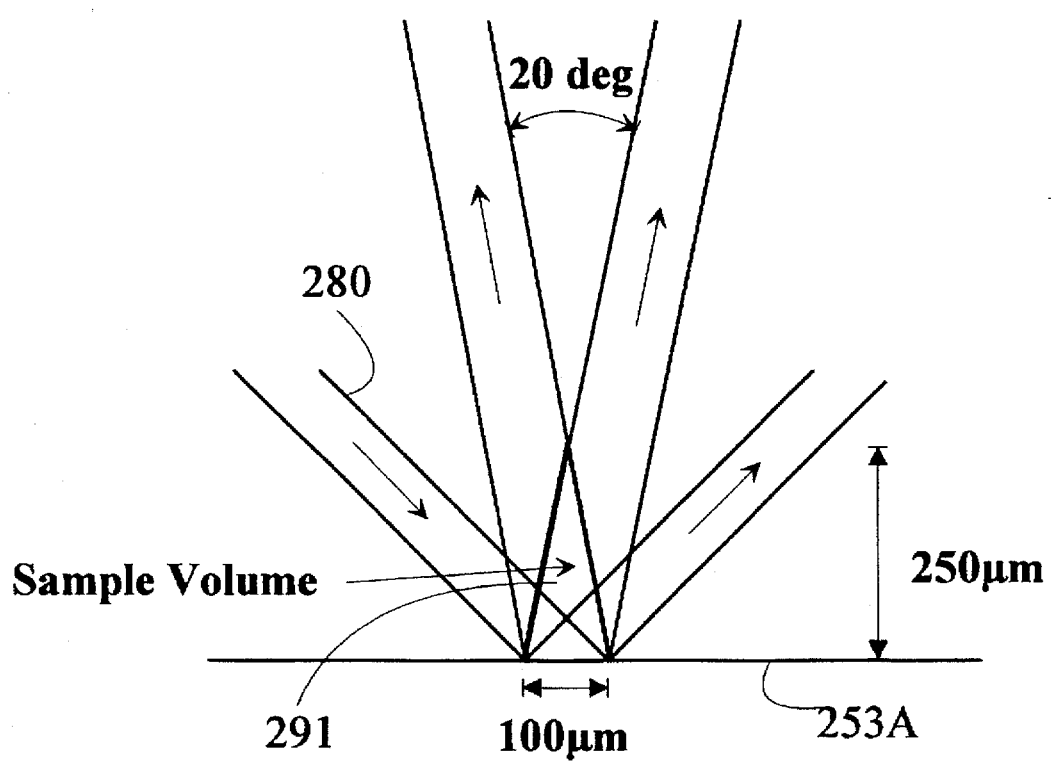
FIG. 13B is a diagrammatic view showing optical beam paths of the apparatus of FIG. 13A.

FIG. 13A shows a Laser Doppler Velocimeter apparatus 290 for utilizing a LDV hologram 253A, recorded as described above, to remotely measure velocity of air or other fluids flowing in the vicinity of the surface. As shown in FIG. 13A, the LDV measurement apparatus according to the present invention includes a laser 255 coupled to a reference beam optical fiber 260 by means of a fiber optic coupler 261. Reference beam optical fiber 260 is in turn coupled to a collimating lens assembly 264, which produces a plane reference wave incident upon LDV HOE 253A. As shown in FIG. 13B, reference beam 280 is diffracted by LDV HOE 253 to produce a wedge-shaped sample volume 291 of interference fringes. The interference fringes in sample volume 291 are scattered by small particles naturally present in the sample volume or introduced thereto by a seeding apparatus 290.

LDV apparatus 290 includes a collecting optics assembly 295 for focusing light scattered off of particles in sample volume 291 onto a photodetector 296. Because of the inherently low intensity level of scattered light in sample volume 291, photodetector 296 is preferably a photomultiplier tube (PMT) rather than a silicon photodiode.

Figure 14A:
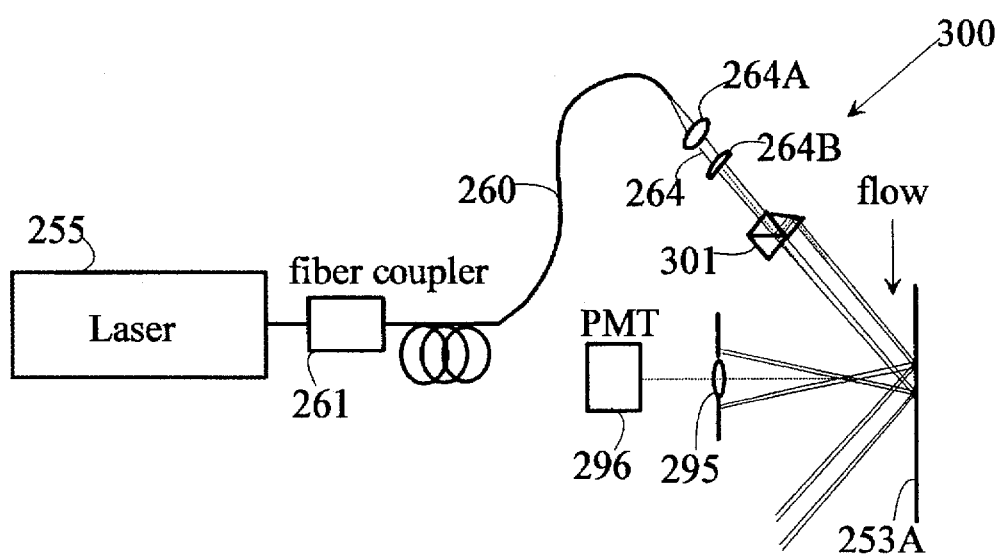
FIG. 14A is a schematic view showing another embodiment of an apparatus according to the present invention used to perform LDV measurements.

FIG. 14A illustrates a modification of the Laser Doppler Velocimeter apparatus 290 of FIG. 13, in which the height of the sample volume above a test surface may be optically adjusted.

As shown in FIG. 14a, an adjustable height LDV apparatus 300 according to the present invention includes a laser 255, fiber optic coupler 261, fiber optic cable 260, collimating lens assembly 264, collecting optics assembly 295, and PMT detector 296. Additionally, adjustable height LDV apparatus 300 includes a beam doubler assembly 301 interposed in the optical beam path between collimating lens assembly 264 and LDV HOE 253A.

Figure 14B:
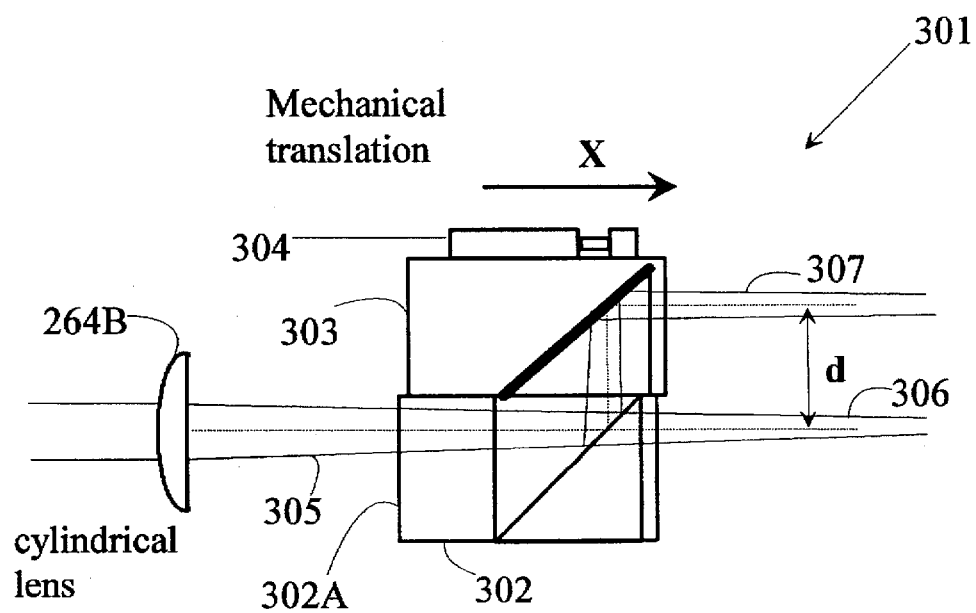
FIG. 14B is a partly diagrammatic view of part of the apparatus of FIG. 14A, on a somewhat enlarged scale.
Figure 14C:
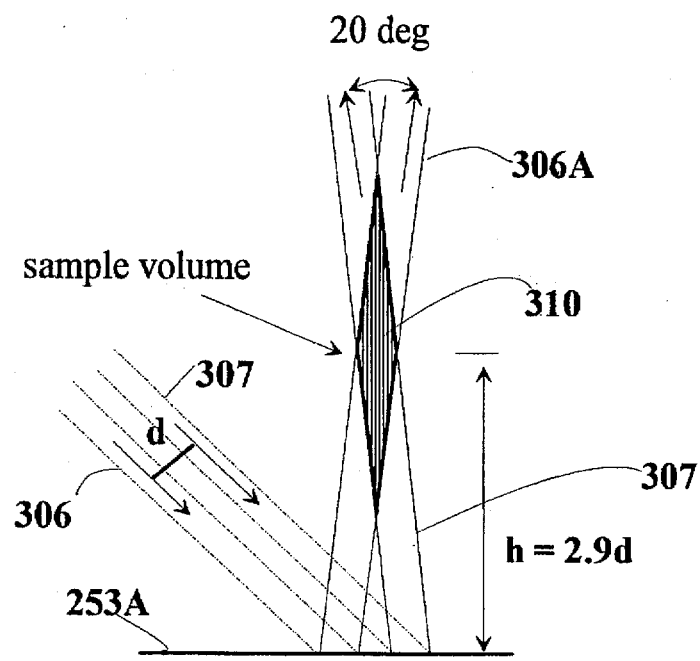
FIG. 14C is a diagrammatic view showing optical beam paths of the apparatus of FIG. 14A.

As may be seen best by referring to FIG. 14b, beam doubler assembly 301 includes a first beam splitter prism 302, a second right angle prism 303 slidably mounted on the exit face of the first prism, and a linear actuator 304 for translating the second prism with respect to the first prism. Thus constructed, beam doubler assembly 301 splits a single beam 305 directed onto entrance face 302A of first prism 302 by cylindrical lens 264B into two parallel output beams 306 and 307. The lateral spacing between output beams 306 and 307 may be adjusted to a desired value by causing linear actuator 304 to translate a pre-determined distance. As shown in FIG. 14C, controlling the lateral spacing between beams 306 and 307 incident upon the surface of LDV Holographic Optical. Element 253A, beams 306A and 307A, respectively, diffracted from the surface, intersect in a sample volume 31 at a height adjustable above the surface.

Figure 15:
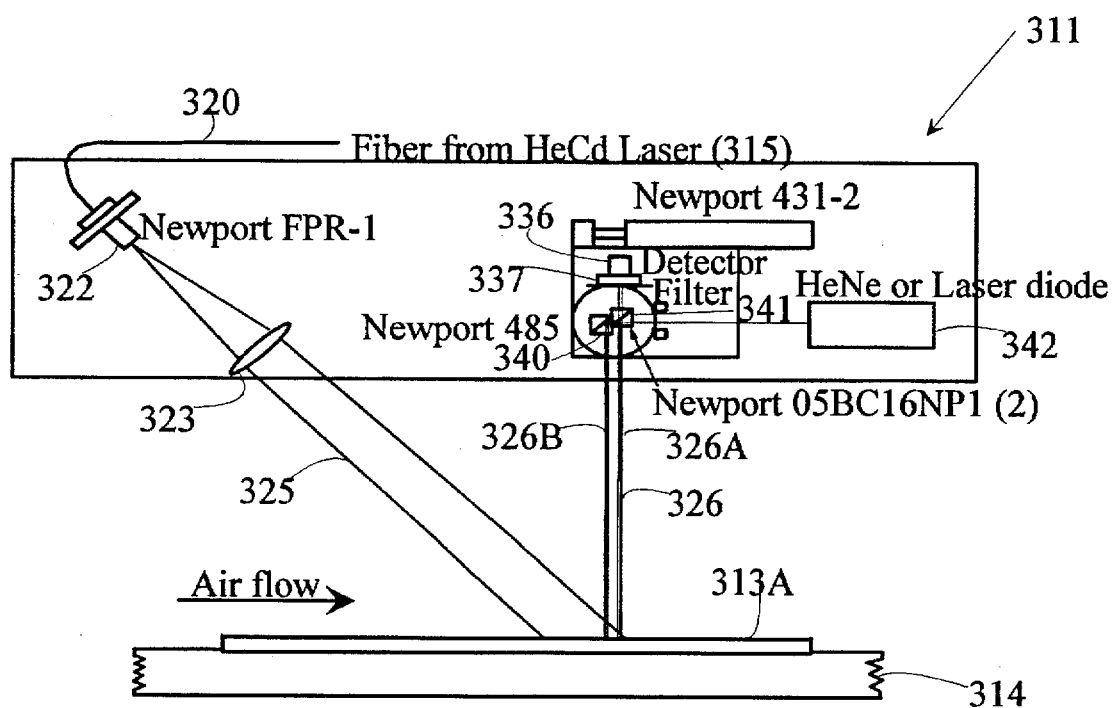
FIG. 15 is a schematic view showing an apparatus according to the present invention used to measure boundary layer transitions.

FIG. 15 shows a boundary layer transition (BLT) detector apparatus 311 according the present invention. This apparatus uses a "smart sensor" holographic optical element 313A attached to the surface 314 of a test object and is similar in construction to strain gauge sensor 133A shown in FIG. 7 and described above. However, BLT detector apparatus 311 uses only one reference beam 325. Reference beam 325 is provided by a HeCd or other laser 315, the output beam of which is coupled through an optical fiber 320 to a polarization rotation fiber holder 322 and collimating lens 323 which together comprise collimating optics for the reference beam.

As shown in FIG. 15, reference beam 325 is obliquely incident upon HOE 313A, which produces a diffracted beam 326 directed normally away from the surface of the HOE. Diffracted beam 326 is resolved into two beams 326A and 326B by a pair of beam splitting prisms 340 and 341 located in front of a filter 337 and photodetector 336. This arrangement comprises an interferometer that compares path length stability in two surface regions of test object 314. In a turbulent flow, the path length difference in neighboring areas changes randomly, while in a laminar flow, path lengths (and thus the interference pattern) remain relatively constant.

The sensitivity of BLT detector apparatus 311 may be varied by varying the separation between the two received beams. Preferably, this is accomplished by shifting relative locations of prisms 340 and 341. As shown in FIG. 15, BLT detector apparatus 311 may optionally employ a red HeNe laser 342, or laser diode, to aid in alignment of the apparatus and in the precise location of the spot on the surface of HOE 313A monitored by the apparatus. It should be noted that the BLT detector apparatus 311 may be readily reconfigured into a strain gauge apparatus similar to that shown in FIG. 7, by blocking the optical path of one of the prisms 340 341, and turning on a second reference beam.

Experimental Results

Having described above some basic embodiments of the present invention, and the theory of their operation, a more detailed description of the construction and experimental results of testing apparatus according to the present invention will now be given.

In all of the tests described below, a 488 nm, single line, air cooled argon laser was used to play back holograms recorded using a 442 nm HeCd laser, except where noted. Holographic Optical Element (HOE) sensors made for the tests included three main types; the Laser Doppler Velocimeter (LDV), boundary layer transition detector (BLT) and the strain gauge. Holograms made for these sensors included a 50% retro-reflector grating (RR50) a 100% retroreflector grating (RR100), a 100% retro-reflector grating with an adjacent mirror strip (RR100M) and a two frequency grating having a plus/minus 5 degree beam crossing angle (PM5). The RR50 and RR100 holograms are useable with both the BLT and strain sensor apparatus, while the other above-listed holograms are intended for use with LDV apparatus.

Off Surface LDV—PM5

Figure 21A:
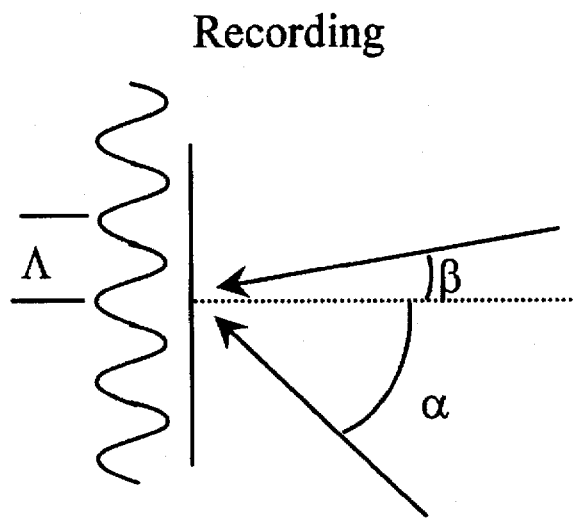
FIG. 21a is a schematic view showing the geometrical arrangement of optical beams used to record the dual-frequency holographic optical element of FIG. 20A.
Figure 21B:
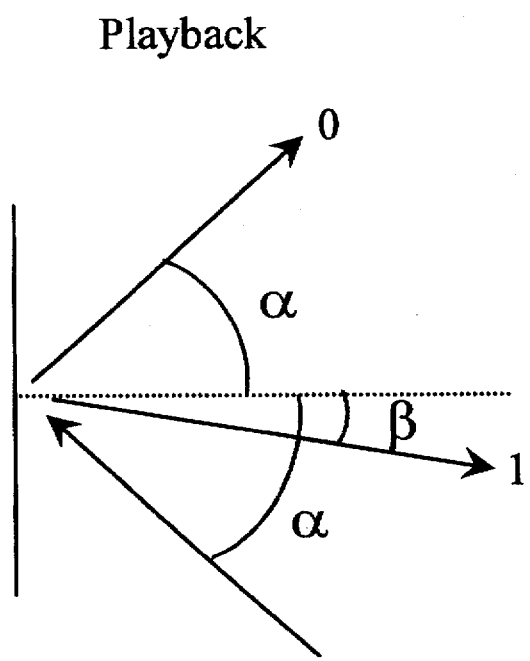
FIG. 21b is a schematic view showing the geometrical arrangement of optical beams diffracted from the dual-frequency optical element of FIG. 20, when the element is addressed.

The LDV sensor known as the PM5, adjustable height LDV, produces a plus/minus five degree crossing angle from two beams incident at 50 degrees (see FIGS. 20A–20D). The recording geometry was modified to compensate for the different playback wavelength as shown in FIG. 21 as follows below in Table A.

TABLE A

| RECORDING/PLAYBACK WAVELENGTH SELECTION | |
|---|---|
| Grating Equation: | $\sin\alpha + \sin\beta = \frac{\lambda}{\Lambda}$ |
| Want: | Playback @ 488 nm, $\alpha = 50$, $\beta = \pm 5$ |
| Need: | $\Lambda = .572$ µm, $\Lambda = .718$ µm |
| | With $\beta = \pm 5$ and $\lambda = 442$ nm |
| | $\alpha = 43.3, 44.6$ |
| Choose: | $\alpha = 44.0$, |
| | $\beta = \pm 5$ for recording → $\Lambda = .565$ µm, .728 µm. |
| Playback angles: | $\lambda = 488$ nm, $\alpha = 50$:$\beta = 5.6, -5.5$ |

This sensor has the advantage of having a small crossing angle which results in a large scattered signal level and wide fringe spacing, producing a low Doppler frequency and high fringe contrast (good for high velocity measurements). Its disadvantages are an inherently low diffraction efficiency (approximately 30%>), a need for careful alignment of the address beams, and multiple sample volumes that arise near the surface due to zero order and second order beams.

The alignment requirement for the address beams is that each should hit on its respective patch on opposite sides of the center line. The beams do not need to fall symmetrically about the center line, making alignment fairly simple for wide beam separations (large probe height); however, at small beam separations (low probe height), this requirement becomes more difficult. At low probe volume heights, the address beam separation is small and in addition to aligning the beams to either side of the center line, the quality of the hologram at the interface between the two patches also becomes problematical. Distortions due to edge diffraction effects, present during the holographic recording, extend 300 to 500 microns across the interface making this region unusable. The multiple sample volumes that arise from interference of the first, second and zero order beams also occur near the surface. Because of these problems arising when using probe volumes near the surface, this sensor is restricted in its minimum useable height; however, its maximum height is restricted only by the physical sensor size.

The current production design of the PM5 smart surface has a usable probe volume height range of 5 mm–10 cm. its dual address beam design also allows it the flexibility of using frequency shifted beams for high speed or bi-directional (separated) flow.

Surface LDV—RR50

The original plan to overcome the height limitation of the PM5 was the surface LDV previously described with reference to FIG. 13. This sensor used the first and second orders from a diffracted address beam to form a sample volume directly above the surface. This sensor was successfully recorded; however, further analysis of its design revealed that additional unwanted sample volumes were created due to interference of the zero order beam with the first and second order beams. In addition to the extraneous sample volumes, the diffraction efficiency was limited to roughly 30%. In order to solve these problems the RR50 was designed.

Figure 22:
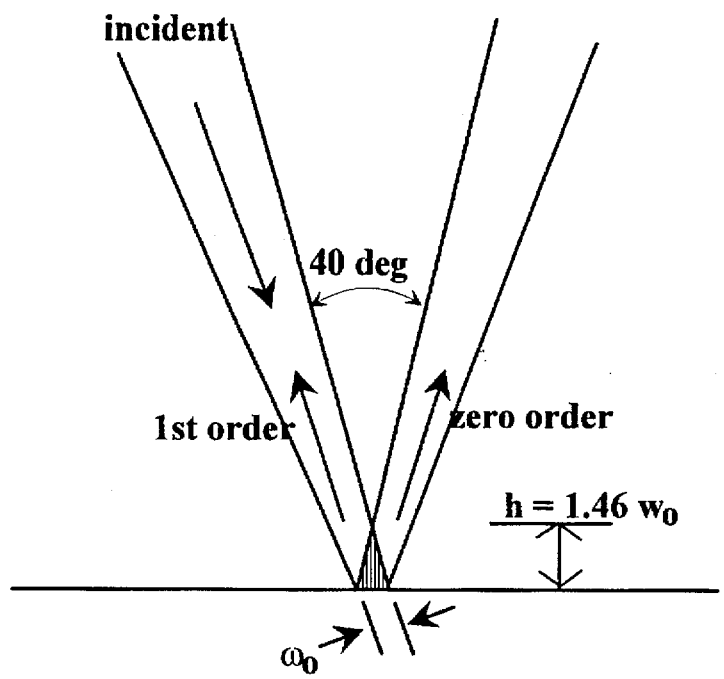
FIG. 22 is a schematic view of an addressing beam and a diffracting beam used to perform LDV measurements at a surface, using a 50% reflective holographic optical element according to the present invention.

The principle of the RR50 is to retro-reflect 50% of the incident beam back onto itself while the other half of the beam propagates forward (see FIG. 22). The sample volume is formed between the zero order and first order beams. For incident angles greater than about 19 degrees (at 488 nm) there is one and only one diffracted order. This results in only one sample volume on the surface. In addition, almost 100% of the reflected light is directed into the probe volume (some light does get absorbed or scattered by imperfections on the surface). The major drawback of this design is the requirement for nearly a forty degree crossing angle, producing a small fringe spacing which leads to a high Doppler frequency. Fortunately, the flow velocity near the surface is approaching zero so the Doppler frequency should be within the limits of the electronics. Table 1 includes the parameters used for recording and playback at a different wavelength such that the playback beam still retains the desired angle.

TABLE 1

Wavelength Corrections For Recording of RR50 and RR100 Holograms

|  | Record | Playback |
|---|---|---|
| Wavelength (μm) | .442 | .488 |
| Reference Angle (deg) | 18 | 20 |
| Object Angle (deg) | 18 | — |
| Grating Spacing | 0.72 μm = 1400 lines/mm | |
| 1st Order Angle | | |
| 19.9, degrees | | |

The sensor is addressed by a single beam that can fall anywhere on the hologram, making alignment extremely simple. The most stringent alignment requirement is that the beam must be focused on the surface within the Rayleigh length. The probe volume height is roughly equal to the waist of the focused spot so the minimum height is governed by the focal spot size and the ability to maintain it on the surface. Table 2 summarizes the probe volume height, focal spot size and alignment tolerance. Below 100 microns the alignment tolerance falls below 1 cm which, although possible, presents significant difficulties since factors such as the refractive index of wind tunnel windows will come into play. Since probe heights are increased by simply increasing the sample volume size, the upper height limit is a function of the maximum allowable volume. Also, the single address beam means that no frequency shifting is possible in this design so that it cannot monitor flow i reversals and is limited in its velocity range (as a result of electronics), thus putting further restrictions on the maximum height. Given the above considerations, a practical working range for this sensor is from 75 to 500 microns.

TABLE 2

Trade Off Between Height, Spot Size and Rayleigh Length For Surface LDV - RR50

| Probe Height (Max) (μm) | Beam size at focus (μm) | Alignment tolerance (mm) |
|---|---|---|
| 10 | 6.8 | .15 |
| 30 | 20 | 1.3 |
| 50 | 34 | 3.7 |
| 75 | 51 | 8.5 |
| 100 | 68 | 15 |
| 150 | 103 | 34 |
| 200 | 137 | 60 |
| 350 | 240 | 185 |
| 500 | 340 | 375 |
| 750 | 500 | 847 |
| 1000 | 684 | 1500 |

Midrange LDV—RR50

Figure 23A:
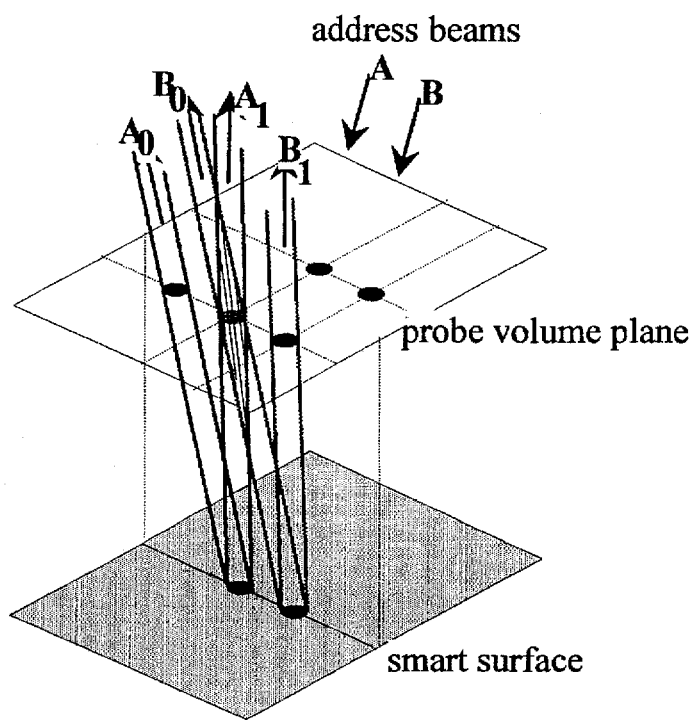
FIG. 23a is a perspective view showing the geometrical relationship between addressing beams and a 50% reflective holographic optical element, in a configuration permitting LDV measurements of a sample volume spaced away from the surface of the element.
Figure 23B:
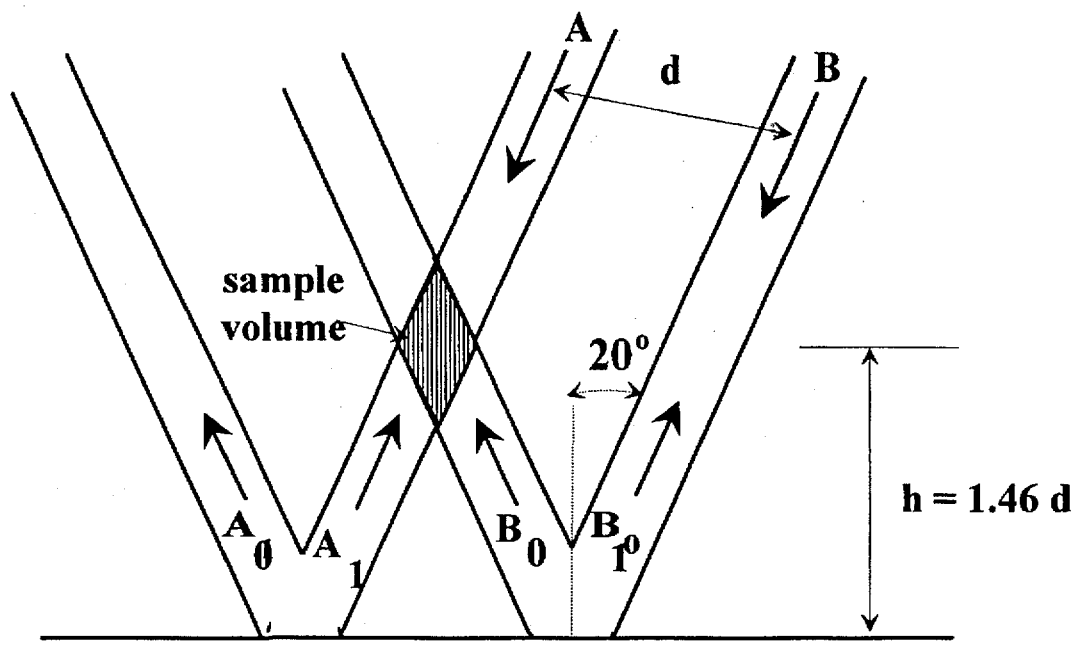
Figure 24:
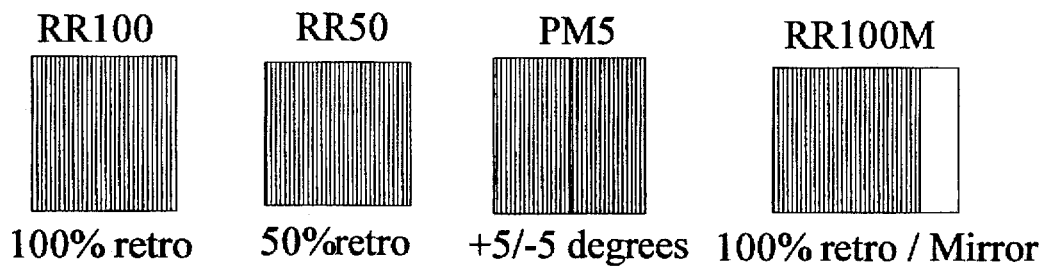
FIG. 24 is a plan view of a holographic optical element according to the present invention which includes a mirrored surface adjacent the grating surface.

The RR50 is also capable of operating in an off-surface mode similar to the PM5. Two parallel address beams are incident on the surface and the probe volume is formed by the interference of the first order retro-reflection of the first beam with the zero order reflection of the second beam. If this is done out-of-plane, the resulting sample volume will form in a region free from other beams. The beam paths for this configuration are shown in FIG. 23. Key features of this design are that (1) the parallel beams can be incident anywhere on the hologram, making alignment simple, (2) frequency shifting is possible, allowing measurement of flow reversal and compensation for high velocity flow and (3) the steep address angle allows the probe volume to be placed very close to the surface. The drawbacks to this design are that a maximum of 50% of the light reaches the probe volume (which is still better than the PM5), and the wide crossing angle results in small fringe spacing as discussed previously. In theory, the probe volume can be placed right on the surface; however, there will be a large amount of scattered light from the other 50% of the light in the extra beams. At the surface, each beam will form a sample volume identical to the surface LDV (i.e., stationary fringes the size of the beam waist). Because frequency shifting can be used, the scattered signals from the stationary fringes or single beams may be filtered electronically. However, the optical low frequency or DC signals cannot be filtered from the PMT and care must be taken to ensure that these signals do not saturate the detector or swamp out the desired signal. The minimum achievable beam separation of two focusing parallel beams and the unwanted scattering signals will ultimately govern how close to the surface the probe volume can be placed.

We believe that this sensor design can bridge the gap between the surface and PM5 LDV's. Reasonable estimates show that this sensor should work comfortably in the 200 micron to 10 mm range. The RR50 is a simple design yet it provides the flexibility to be used in a wide variety of applications (we will later see that it can also function as a BLT or strain temperature sensor) making it the most versatile smart surface of the three designs.

Midrange LDV—RR100M

Figure 25:
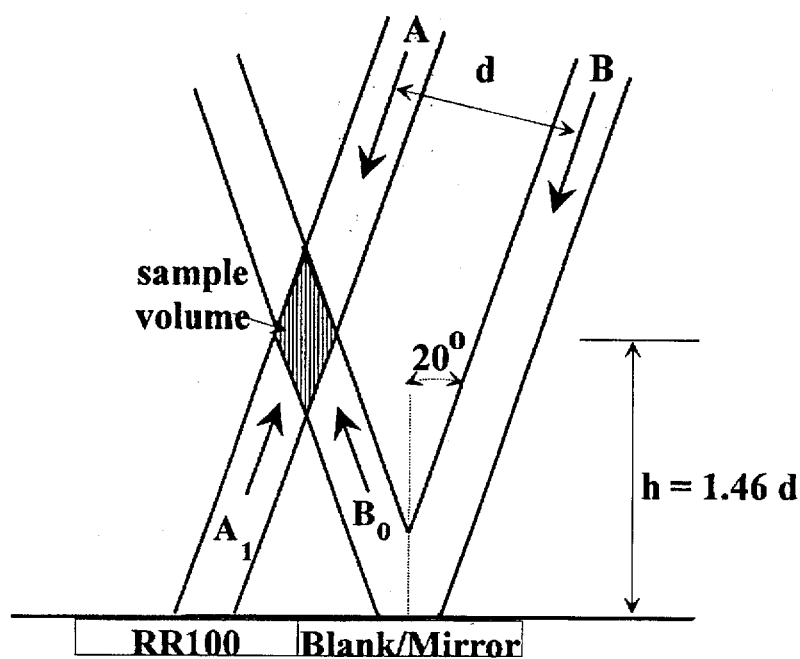
FIG. 25 is a schematic view of optical beams used to perform LDV measurements above the surface of the grating/mirror optical element of FIG. 24.

This design uses the same geometrical configuration as the RR50 midrange, crossing first and zero order beams, but has separate holograms for each address beam similar to the PM5. In the retroreflective geometry, it is possible to obtain diffraction efficiencies approaching 100% (>90% typical). The RR100 makes use of this high efficiency grating and combines it with a mirrored surface to direct nearly all the light into the sample volume. FIG. 25 illustrates the geometry of this sensor.

Because the sensor has the same geometry as the RR50, all the same performance arguments apply except that the ease of alignment has been compromised for high diffraction efficiency. The two beams must now fall on either side of the center line which, as in the PM5, becomes increasingly more difficult as sample volume height comes close to the surface. Because the interface between the two sides is obtained by masking directly onto the holographic surface during recording, the edge effects present in the PM5 are mitigated. This allows sample volumes to be significantly closer to the surface. The usable range for this design is estimated to be the same as the RR50 midrange, namely 200 microns–10 mm. Because one of the surfaces is not a hologram but simply a mirror, this sensor is incapable of being extended to a curved surface since the mirrored side can perform no surface corrections.

Boundary Lay Transition Sensor—RR100, RR50

Figure 26:
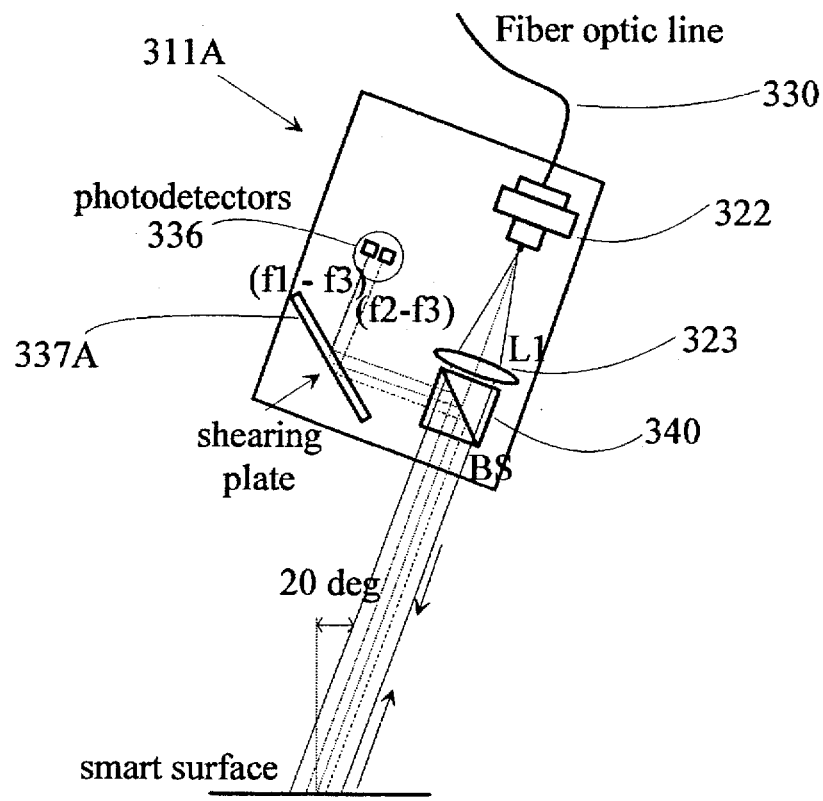
FIG. 26 is a diagrammatic view of a Boundary Layer Transition (BLT) sensor according to the present invention.

The Boundary Layer Transition (BLT) sensor works by making an interferometric comparison of paths from two neighboring regions: near the surface. FIG. 26 illustrates the operation of this sensor in more detail. This sensor 311A uses the RR100 hologram design to achieve ultra high efficiency. Note that the RR100 and RR100M are physically the same sensor but in the case of the BLT, the mirror side is not used. The RR50 surface could also be used in this application with a 3 db loss in signal strength. Because this sensor uses the returned light directly (i.e., it doesn't look at scattered light like the LDV), this reduction in intensity should be insignificant.

The transmitting side of the sensor consists of a large collimating lens 323 approximately 1" in diameter. The receiving side consists of a beam splitter 340, 341 to pick off a portion of the returned beam, a thick shearing plate 337A on a rotation stage to interfere different portions of the return beam and a detector 336 (or multiple detectors) to monitor the interference. FIG. 26 shows an example of this set-up.

The basic operation of the sensor is to examine the relative phase difference between two paths striking the sensor at different locations. The two locations are located along the direction of flow as shown in FIG. 26 by paths 1 and 2. The detector is immune to planar vibration of the smart surface, transmitter/receiver and optical windows for displacements in the x, y or z directions because it affects both beams equally. It is, however, sensitive to angular vibrational motion (shown as $\theta$ in the Figure). There are several ways to overcome this sensitivity. The first way is through electronic processing. Under steady state flow conditions, vibrational signatures would likely be centered around a resonant frequency. By electronically filtering out this band, some degree of compensation could be obtained. This method would be particularly effective if the vibration frequency was either much lower or higher than that of the turbulent phenomena being studied.

The second method of compensation is to compare the phase of three test points on the reflected beam front. The angular vibration component of the middle point will be zero due to symmetry and thus can be used to optically subtract off the planar displacement component from each of the two beams. These two signals are then received by a photodetector and are then electronically subtracted to uncover the turbulence signal. Mathematically this can be written as, $$\phi_1(t)=A(t)+B(t)+C(t)$$

$$\phi_2(t)=A(t)-B(t)+C(t+\delta t_2)$$

$$\phi_3(t)=A(t)+C(t+\delta t_3)$$

Where $\phi_i$ is the phase of the i'th beam, $A(t)$ is the phase change due to planar displacement, $B(t)$ is the phase change due to angular displacement and $\delta t$ is a time delay. DC phase terms have been omitted. $B(t)$ changes sign but not magnitude between beam 1 and 2 because of our choice of coordinates. Our coordinate choice also ensures that the angular vibration component is zero at point 3. Note that bending has been neglected in this analysis. If beams 1 and 2 are each optically interfered with beam 3 the resulting intensity amplitude is given by, $$I_1=I_0 \cos(B)(t)+C(t)-C(t+\delta t_3))$$

$$I_2=I_0 \cos(-B)(t)+C(t+\delta t_2)-C(t+\delta t_3))$$

where the intensity of beams 1, 2 and 3 are assumed to be equal and the DC term has been neglected (through AC coupling). These two optical signals are then received by photodetectors that convert it to electrical signals and then digitized. The phase can then be extracted from the signal digitally and subtracted to yield a signal proportional to the turbulent event.

Strain Gauge—RR50, RR100

Figure 16:
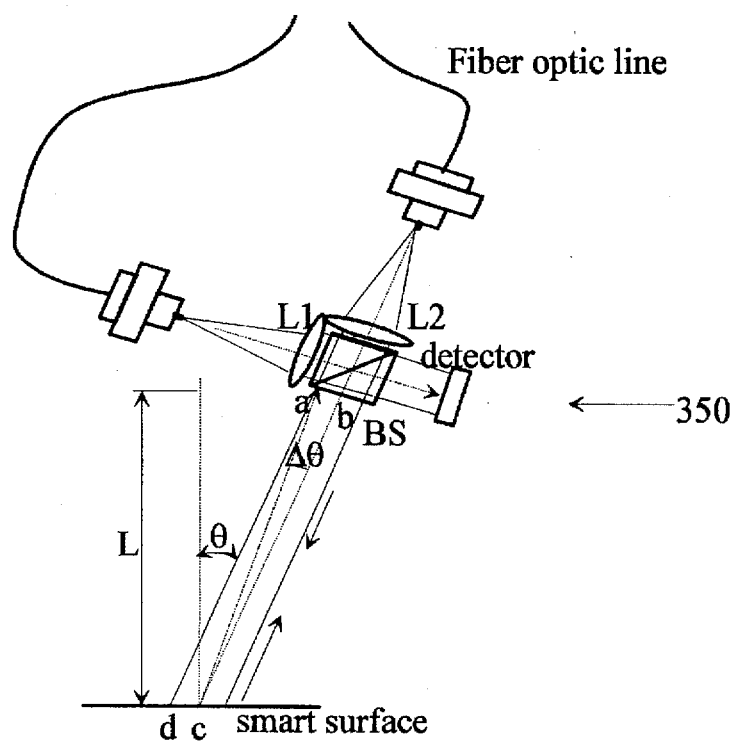
FIG. 16 is a schematic view of another strain gauge apparatus according to the present invention, which uses a 100% reflective holographic optical element.

The strain gauge works by detecting changes in the returned light beam due to a deformation of the grating surface. Both temperature changes and mechanical stress produce a compression or expansion of the surface. The change in holographic grating spacing causes a change in the diffracted beam's light path. The undiffracted or zero order beam is unaffected by the change in grating period. This asymmetry can be used to provide compensation for vibration and drift. FIG. 16 shows an embodiment 350 of a strain gauge sensor using the RR100 hologram. In the simplest case, only one point of the retro-reflected beam needs to be measured order to detect changes in the grating. The path length change of the returned beam can be visualized from the picture in FIG. 16.

The path for the perfect retro-reflected beam from points a to d and back is given by, $$R_1=\frac{2L}{\cos\theta}$$

where L is the distance between the surface and receiver and $\theta$ is the angle between the surface normal and the reflected (and incident) beam. The path length resulting from a small change in the reflected angle is (along path b-c-a), $$R_2=\frac{L}{\cos(\Theta+\Delta\Theta)}1+\cos(\Delta\Theta)$$

where $\Delta\theta$ is the angular displacement of the beam caused by the change in the grating. The path length difference is then $$\Delta R = R_1 - R_2 \approx \frac{2L\sin\Theta}{\cos^2\Theta} (\Delta\Theta)$$

where it has been assumed that $\Delta\Theta \ll \Theta$. The optical phase change is given by, $$\Delta\Theta = \frac{2\pi}{\lambda} \Delta R \approx \frac{4\pi L \sin(\Theta)\Delta\Theta}{\lambda\cos^2(\Theta)}$$

where $\lambda$ is the free space optical wavelength. The diffracted beam angle, $\theta$, is given by the grating equation, $$\sin\alpha + \sin\Theta = \frac{\lambda}{\Lambda}$$

where $\alpha$ is the incident angle and $\Lambda$ is the fringe spacing of the grating. In the case of the retro-reflective grating, $\alpha = \theta$. For small changes in the grating period, the corresponding change in the diffracted angle can be written as $$\Delta\Theta \approx \frac{\lambda}{\Lambda\cos\Theta} \frac{\delta\Lambda}{\Lambda}$$

where $\delta\Lambda$ is the change in grating spacing and it has been assumed that $\Delta\Theta \ll \Theta$ and $\delta\Lambda \ll \Lambda$. These assumptions will be checked when calculating dynamic range. Combining equations 6 and 8 we can write the phase change as a function of grating deformation $$\Delta\phi = \frac{4\pi L\tan(\theta)}{\lambda\cos^2(\theta)} \frac{\delta\Lambda}{\Lambda}$$

This is a new sensor equation for both the mechanical stress and temperature measurement. If this beam is interfered with a frequency shifted beam (e.g., using an Acoustic Optic Modulator (AOM)), the intensity of the resulting optical signal can be written as, $$I(t) = (I_0 + I_\omega) + \sqrt{I_0 I_\omega} \cos(\omega + \Delta\phi)$$

where $I_0$ and $I_{1o7}$ are the intensities of the unshifted and shifted beams and $\omega$ is the frequency shift.

Figure 17:
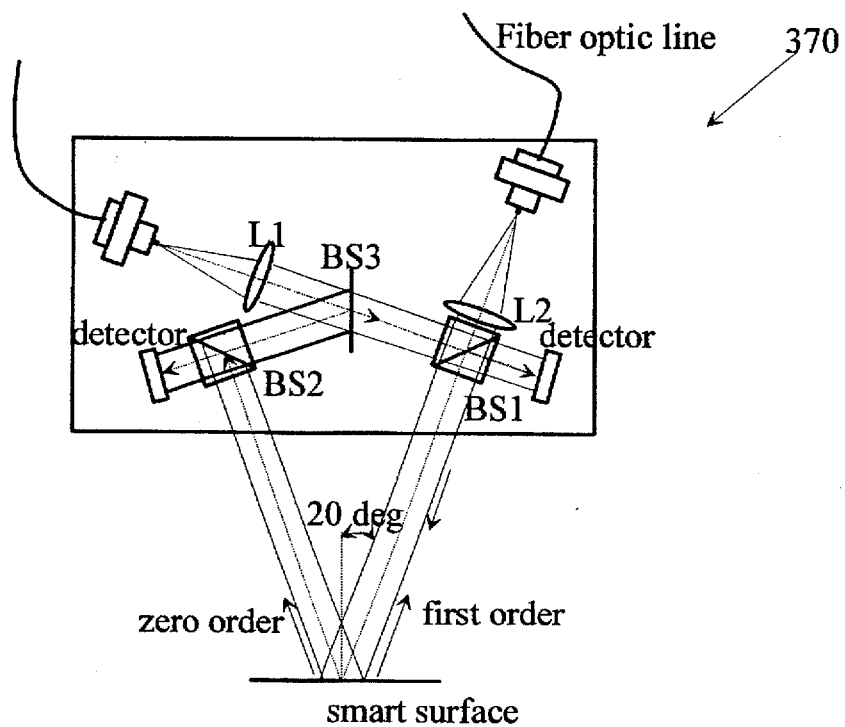
FIG. 17 is a schematic view of another strain gauge according to the present invention, which uses a 50% reflective holographic optical element.

By electrically heterodyning this signal with the driving modulation frequency B (from the AOM for example), the phase shift: and hence the change in grating spacing can be found. The heterodyne technique is necessary to eliminate the time-varying intensity fluctuations and to compensate for modulation depth (i.e., beams do not have to be of equal intensity). While this technique detects changes in the grating spacing, it is also sensitive to vibrations of the surface, both planar and angular. Again, vibrations can be filtered electronically if the noise is well behaved. Alternatively, this vibration can be compensated for by monitoring the zero order beam's phase since it will be effected equally by vibration but is insensitive to grating spacing changes. By employing an identical heterodyne technique to detect the signal's phase, the vibration component may be digitally subtracted from the retro-reflected signal to obtain the true strain component. This arrangement is shown in FIG. 17.

If the smart sensor is rigidly coupled to the model surface (using a strong glue for instance), the linear expansion of the surface will be translated to the sensor. Temperature expansion or "thermal strain" follows the simple formula of $$\Delta L = \alpha L \Delta T$$

where L is length, $\Delta L$ is the change in that length, $\Delta T$ is the change in temperature and $\alpha$ is known as the thermal expansion coefficient. Care must be taken to ensure a reasonable match between the coefficient of expansion for the glue and the substrate. Assuming a uniform deformation of the material, $$\frac{\delta\Lambda}{\Lambda} = \frac{\Delta L}{L} = \alpha\Delta T$$

Substituting equation (12) into (9) we arrive at an expression that gives a linear relationship between temperature change and phase change.

$$\Delta\phi = \frac{4\pi L\tan(\theta)}{\lambda\cos^2(\theta)} \alpha\Delta T$$

Table 3 tabulates the sensitivity of the system for several substrates, using the design parameters for the RR50 holographic sensor in equation 13 and assuming a detector range of 20 cm. $\Delta T_{min}$ represents the minimum detectable temperature change for the given system fringe sensitivity. A fringe resolution of 1 corresponds to counting fringes while lower values correspond to more accurate phase measurements. Fringe resolutions of 1/200th are not unreasonable using a good heterodyne mixer.

TABLE 3

Thermal Strain Gauge - Sensitivity

| Material | Coefficient of Thermal Expansion | $\delta T_{min}$ @ 1 Fringe Resolution | $\delta T_{min}$ @ ½ Fringe Resolution | $\delta T_{min}$ @ 1/50 Fringe Resolution |
|---|---|---|---|---|
| Aluminum | $2.3 \times 10^{-5}/°C$ | 0.18° C. | 0.09° C. | 0.004° C. |
| Glass | $8.0 \times 10^{-5}/°C$ | 0.05° C. | 0.03° C. | 0.001° C. |
| Rubber | $16 \times 10^{-5}/°C$ | 0.03° C. | 0.01° C. | 0.0005° C. |

Table 4 calculates the full scale range of temperature differential that can be measured as a function of $\Delta\theta$ which, as seen in (8), is linearly related to the amount of strain, $\delta\Lambda/\Lambda$, in the material. The assumption leading to equation 5 can then be checked to estimate the amount of error introduced using the small angle approximation. The approximation is seen to hold well as the error is less than 1% even at a change in retro-angle of 5 degrees which corresponds to a significantly high temperature.

TABLE 4

Thermal Strain Gauge - Dynamic Range

| Change in retro angle, $\Delta\theta$ | .1 deg | 1 deg | 5 deg |
|---|---|---|---|
| Grating change, $\delta\Lambda/\Lambda$ | 0.23% | 2.4% | 12% |
| Error in reading | 0.004% | 0.03% | 0.1% |
| Aluminum | 104° C. | 1040° C. | 5200° C. |
| Glass | 30° C. | 300° C. | 1500° C. |
| Rubber | 15° C. | 150° C. | 740° C. |

Surface stretching or "strain" can also be produced by mechanical forces as well. This could be in the form of structural loading or pressure applied to the surface. The equation for linear expansion produced by stress is given by, $$\frac{\Delta L}{L} = \frac{\sigma}{E}$$

where E is the modules of elasticity and σ is the stress component parallel to the grating vector (i.e., in the plane of the surface, normal to the fringes). Similarly, for pressures applied normal to the surface, the linear expansion is given by $$\frac{\Delta L}{L} = \frac{\nu P}{E}$$

where P is the surface pressure (or normal stress) and ν is known as Poission's ratio. A typical value for ν would be on the order of 0.3, yielding a ⅓ decrease in sensitivity and a factor of 3 increase in dynamic range. Table 5 summarizes the minimum resolvable stress as a function of fringe resolution and material composition and Table 6 lists the corresponding dynamic range as a function of system error.

TABLE 5

Mechanical Strain Gauge - Sensitivity

| Material | Modules of Elasticity, E | $\sigma_{min}$ @ 1 Fringe Shift | $\sigma_{min}$ @ 1/200 Fringe Shift | $\sigma_{min}$ @ 1/1000 Fringe Shift |
|---|---|---|---|---|
| Aluminum | 70 GPa | 44 psia | 4.4 psia | 0.22 psia |
| Glass | 65 GPa | 41 psia | 4.1 psia | 0.21 psia |
| Plastic* | 3 GPa | 2 psia | 0.2 psia | 0.01 psia |

*Polystyrene

TABLE 6

Mechanical Strain Gauge - Dynamic Range

| Error in Reading | 0.004% | 0.03% | 0.1% |
|---|---|---|---|
| Aluminum | $2.5 \times 10^4$ psia | $2.5 \times 10^5$ psia | $1.2 \times 10^6$ psia |
| Glass | $2.3 \times 10^4$ psia | $2.3 \times 10^5$ psia | $1 \times 10^6$ psia |
| Rubber | $1 \times 10^3$ psia | $1 \times 10^4$ psia | $5 \times 10^4$ psia |

Typical aerodynamic shear stress is on the order of 0.001–0.01 psia which is less than the minimum resolvable values calculated here. This allows temperature measurements to be made without interference due to aerodynamic sheer stress. Alternatively, it is possible to measure large scale structural deformations produced by mechanical loading, air foil lift or pressure changes of the magnitude described above.

HOLOGRAM RECORDING

Reflection or standing wave holograms were recorded using a HeCd (441.6 nm) laser on glass substrates coated with Shipley 1400 Series photoresist, manufactured by Shipley Company, 16782 Von Karman Avenue, Irvine, Calif. 92714.

Beam uniformity turned out to be a key issue during recording. Using short focal length lenses, 5–10 cm, results in a collimated beam. However, the intensity profile is Gaussian resulting in a non-uniform exposure. Characteristics of such an exposure is a bowl-shaped resist profile superimposed on the fringes. This typically results in a reconstructed beam having a ring or central dot of high intensity while the rest of the reconstruction is dim. To alleviate this problem, longer focal length lenses are used resulting in an overfilling of the lens aperture (D=1") and a more uniform intensity distribution.

The coating thickness was nominally 1.5 microns. The minimum coating thickness necessary is about 100 Å (angstroms) and there is no upper limit on the thickness. In practice, it is difficult to achieve optically flat coatings (roughness <¼λ) for thicknesses greater than 20 μm. The current procedure used to expose and develop the plates is:

1. Beams and optics aligned then laser output blocked with shutter.
2. Room lights off, yellow 10W safe light on.
3. Plate positioned in holder, enclosure shut.
4. Settling time of 5–10 minutes allowed (leave room).
5. Shutter opened for correct time. Exposure range between 5–25 mJ/cm².
6. Plate repositioned for next shot. Typically 4 shots per plate.
7. Additional settling time of 2–5 min between each exposure.
8. Plate removed after all exposures and placed in light tight box.
9. Solution prepared in darkroom using Shipley 1420 developer, 8:1—Distilled water: developer.
10. Vigorous agitation in solution for 30 seconds.
11. Immediate immersion in flowing water bath for 2 minutes.
12. Dried using compressed nitrogen gas.

This procedure has been used for a variety of exposure energies and beam geometries.

Unwanted "star burst" patterns appeared to be visible on the surface as well as in the reconstructed beam in many of the holograms. This effect was found to be caused from surface reflections from the collimating lenses. Replacement of the optics using high grade anti-reflection coated lenses reduced this problem.

Blazed Grating Development

Relief gratings having a sinusoidal groove profile are limited to a maximum diffraction efficiency of 41%. By introducing a sawtooth groove profile or "blaze," the diffraction efficiency can be increased to near unity. Sheridon[2] demonstrated that by recording the hologram in the reflection or Denisyuk configuration, a blazed grating profile is obtained.

Reflection holograms were recorded using an angle of 200 from the plate normal. Since a beam must enter through the back side of the plate when recording in the reflection mode, black backing cannot be used and Fresnel reflections (that cause large fringes in the hologram) will be present. To avoid these fringes, we obtained a glass plate that has an anti-reflection coating on its back side, and index matched it to the back of the holographic plate. Both glycerin and mineral oil were tested and found to be adequate index matching fluids; the glycerin was preferred since it is water soluble. Matching the plate requires an extra step in processing which requires optical access to the back of the plate. Thus the reflection mode holograms have limited usefulness.

The recording apparatus was then re-configured to record a transmission hologram with a 45 degree angle between the object and reference beams. In an attempt to create a blazed grating and improve the 1st order efficiencies, the holographic plate was placed orthogonal to the object beam. (This corresponds to an offset angle of 225°.) This created a slanted grating and non-sinusoidal fringes. In addition, the non-emulsion side of the holographic plates was painted flat black to eliminate back reflection. Alternatively, an iron oxide or anti-reflection coating, such as Brewer ARC, made by Brewer Scientific, P. O. Box GG, Rolla, Mo. 65401, may be deposited on the plate before the photoresist is applied to the plate. This procedure was used throughout this stage until the recording on the 8"×10" plate.

The transmission type hologram was then modified by increasing the angular difference between the reference beam and object beam to 55 degrees. The change caused a decrease in the 0 order diffracted beam as desired, but at the cost of an increase in the magnitude of light projected into the 2nd order. Also, in the interest of stability, the system was altered to delete one of the incoming fibers and replace it with a cube beam splitter.

In an effort to further decrease the amount of light diffracted into the 2nd order, the separation angle was then increased to 60 degrees. The overall quality of the holograms was greatly diminished due to the small fringe spacing which exceeded the spatial resolution of the photoresist. The transmission hologram setup was returned to the previous configuration where the separation angle was 50 degrees.

After successfully recording the strain/BLT gauge holographic plates, the system required to record the Laser Doppler Velocimeter (PM5) was assembled using a similar set-up. Another cube beam splitter and a mirror were added to create a second object beam. The separation between the two object beams was 10 degrees. A major difference in the PM5 system was in the positioning of the object beams with respect to the reference beam. The angle between the bisector of the object beams and the reference beams was: adjusted to 50 degrees. Also, the two object beams were aligned so that they crossed behind the plate. This alignment allowed for the beams to cross at a distance in front of the plate during reconstruction.

The system was then changed to record a different type holographic smart surface known as the retro-reflecting (RR) series of holograms, in which the hologram was constructed so that the 1st order diffracted beam retro-reflects back onto itself. By varying the exposure time, we could control the amount of light retro-reflected into the first order. Through careful choice of the exposure energies, holograms were made that diffracted either 50% or 100% of the reconstruction beam into the 1st order. These holograms became known as the 50RR and 100RR respectively. In addition, the angle between the object and reference beams was scaled to 36 degrees to compensate for the difference between the recording wavelength of 441.6 nm, and the reconstruction wavelength of 488 nm.

Figure 18:
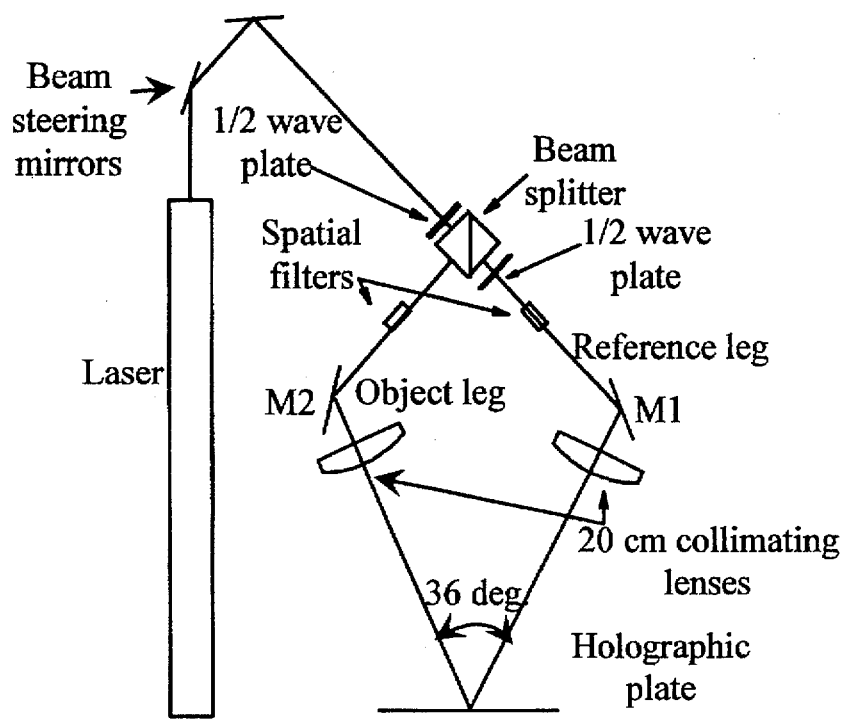
FIG. 18 is a detailed schematic view showing how holographic optical elements of FIGS. 16 and 17 are recorded.

Each of the sensor types were recorded on an 8"×10" holographic plate to be used for producing embossed holograms. We went with an all airborne beam delivery system, eliminating the fiber optic delivery system. In doing so, the stability of the system was greatly enhanced. The first series of recordings on the 8"×10" was the 100RR. Since the only difference between the 100RR and the 50RR is the exposure time, the 50RR followed the 100RR. The set-up diagram for recording the RR's is shown in FIG. 18.

Figure 19:
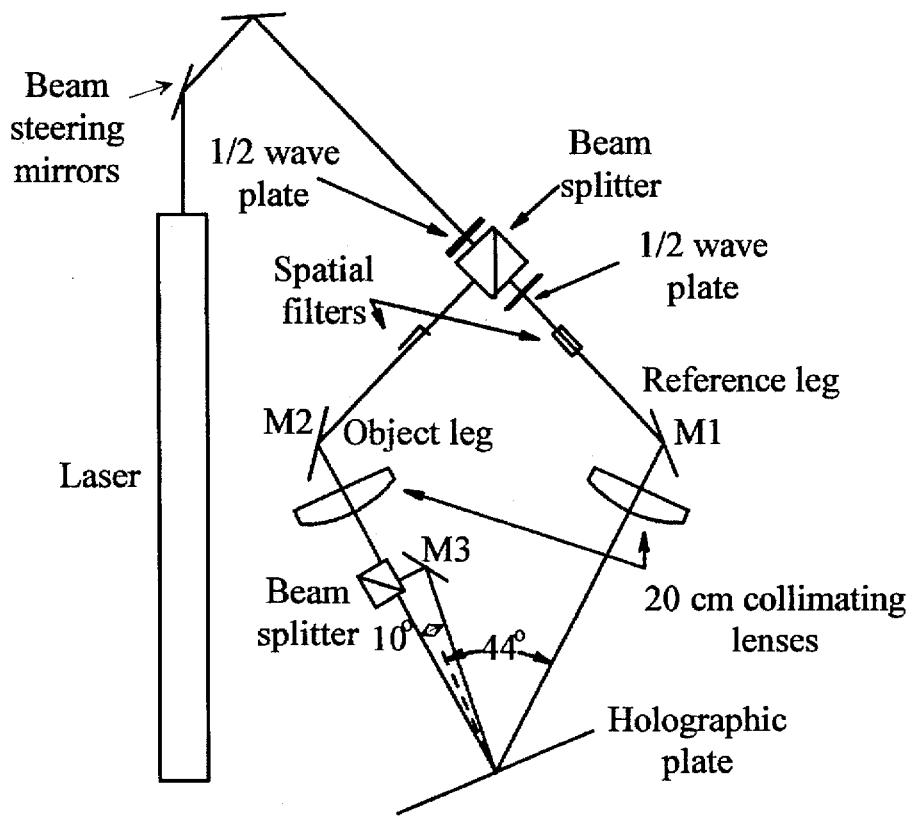
FIG. 19 is a detailed schematic view showing how dual-frequency holographic optical elements, useful for another method of LDV measurement, are recorded.
Figure 20A:
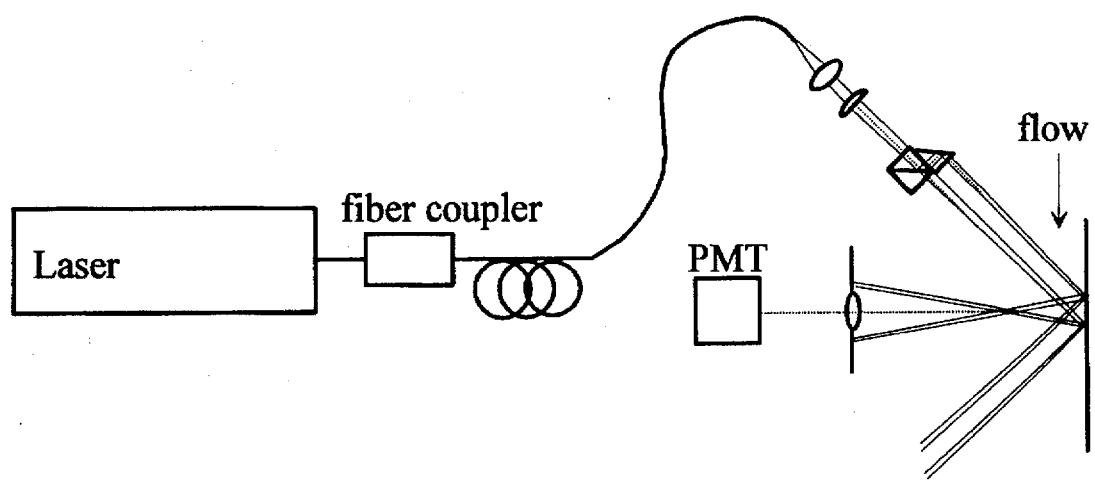
FIG. 20a is a schematic view showing an apparatus according to the present invention for performing LDV measurements using a dual-frequency holographic optical element.
Figure 20B:
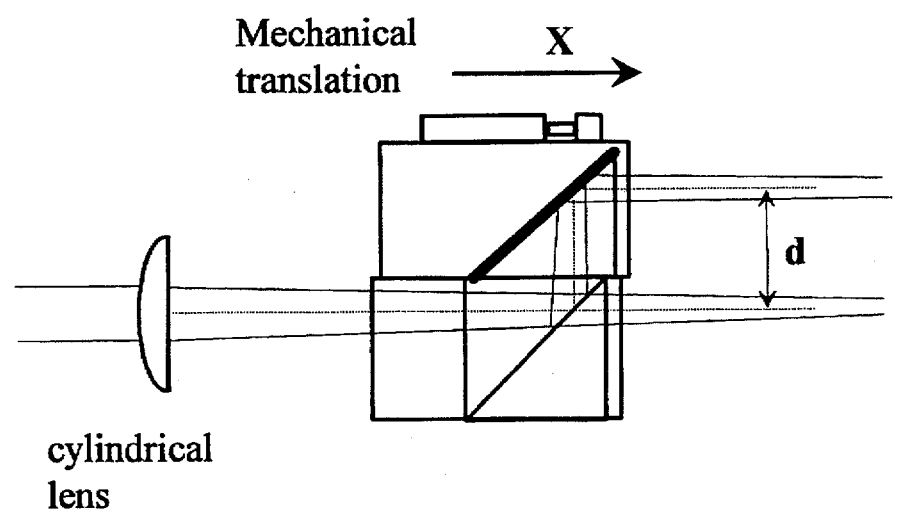
FIG. 20b is a fragmentary view of part of the apparatus of FIG. 20a, on a somewhat enlarged scale.
Figure 20C:
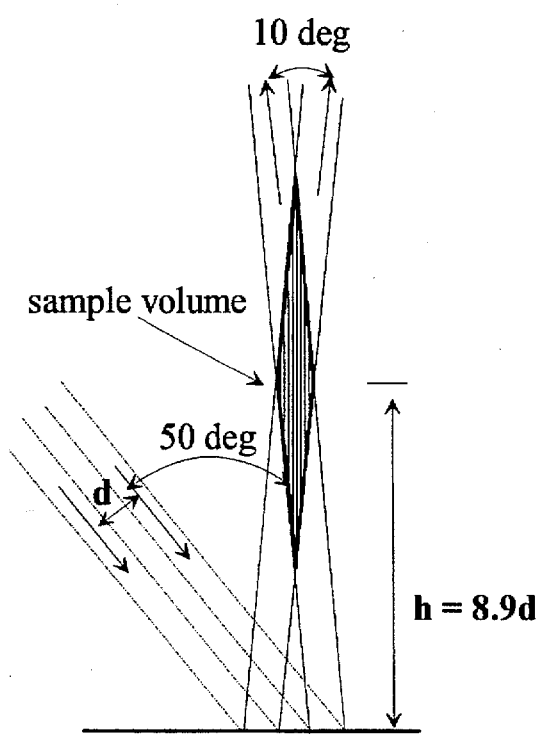
Figure 20D:
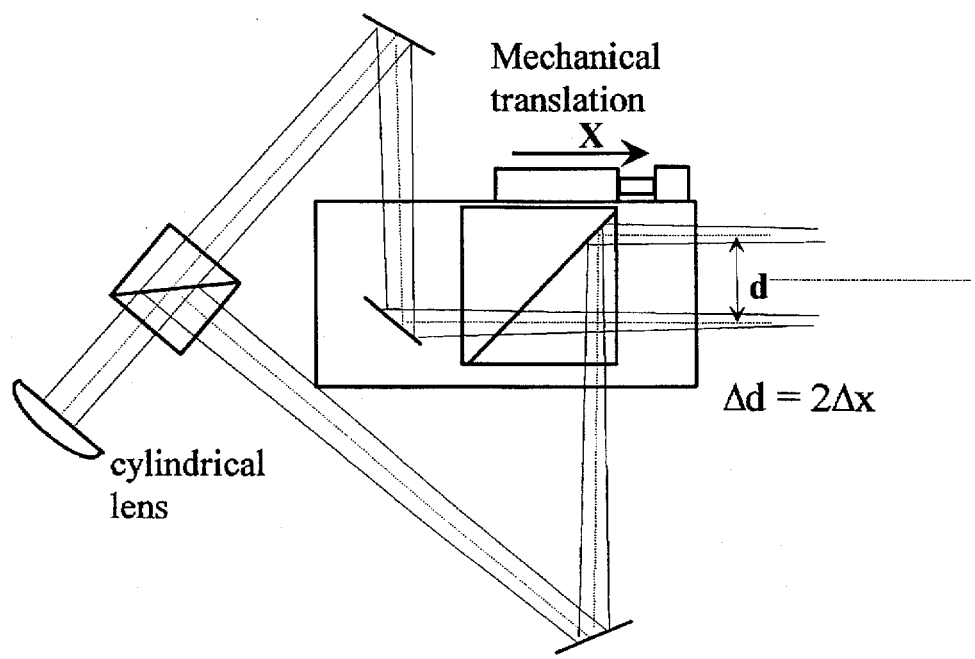

After recording the RR series holograms on 8"×10" plates, we set up to record the PM5. The PM5 system was identical to the one used previously in which an additional beam splitter and mirror were installed into the object beam, as shown in FIG. 19. The recording times, energies, and beam ratios used in exposing the 8"×10" plate are listed in Table 7.

TABLE 7

8" × 10" Holographic Plate Exposure Log

| DATE RE-CORDED | SERIES | POWER TOTAL | EXPOSURE ENERGY | EXPOSURE TIME | BEAM RATIO $P_R$:$P_O$ |
|---|---|---|---|---|---|
| 25 Mar 93 | 100 RR | 3.06 mW | 7.0 $_{cm^2}$mJ | 1.8 sec | 2:1 |
| 25 Mar 93 | 100 RR | 3.06 mW | 7.5 $_{cm^2}$mJ | 1.9 sec | 2:1 |
| 25 Mar 93 | 100 RR | 3.06 mW | 8.0 $_{cm^2}$mJ | 2.1 sec | 2:1 |
| 25 Mar 93 | 100 RR | 2.93 mW | 8.5 $_{cm^2}$mJ | 2.2 sec | 2:1 |
| 25 Mar 93 | 100 RR | 2.93 mW | 9.0 $_{cm^2}$mJ | 2.3 sec | 2:1 |
| 25 Mar 93 | 50 RR | 2.95 mW | 4.0 $_{cm^2}$mJ | 1.1 sec | 2:1 |
| 25 Mar 93 | 50 RR | 2.95 mW | 4.5 $_{cm^2}$mJ | 1.2 sec | 2:1 |
| 25 Mar 93 | 50 RR | 2.95 mW | 5.0 $_{cm^2}$mJ | 1.3 sec | 2:1 |
| 25 mar 93 | 50 RR | 2.93 mW | 5.5 $_{cm^2}$mJ | 1.5 sec | 2:1 |
| 25 Mar 93 | 50 RR | 2.93 mW | 6.0 $_{cm^2}$mJ | 1.6 sec | 2:1 |
| 28 Mar 93 | PM5 | 2.11 mW | 9.0 $_{cm^2}$mJ | 3.3 sec | 2.5:1(5:1)* |
| 28 Mar 93 | PM5 | 2.11 mW | 10.0 $_{cm^2}$mJ | 3.7 sec | 2.5:1(5:1)* |
| 28 Mar 93 | PM5 | 2.11 mW | 10.5 $_{cm^2}$mJ | 3.9 sec | 2.5:1(5:1)* |
| 28 Mar 93 | PM5 | 2.11 mW | 11.0 $_{cm^2}$mJ | 4.1 sec | 2.5:1(5:1)* |
| 28 Mar 93 | PM5 | 2.11 mW | 12.0 $_{cm^2}$mJ | 4.5 sec | 2.5:1(5:1)* |

( )*Before angular correction factor

To assess the quality of the holograms, a Newport 815 photodetector was used to measure diffraction efficiency. By measuring the energy in the reconstructed beam and the zero order reflected beam, diffraction efficiency can be calculated using, $$\eta = \frac{P_1}{(P_1 + P_0)}$$

where $P_1$ and $P_0$ are the energies in the first order and zero order beams respectively. If there is more than one diffracted order then the additional energy is included in $P_0$. The results for the standard strain gauge holograms (not RR Series) are shown in Table 8. Efficiencies have increased from less than 1% to a maximum of 62% since the initial recordings. While we will continue to refine our procedure as well as explore other methods to increase efficiency, values of 60% should be sufficient for the smart surfaces application.

TABLE 8

Diffraction Efficiency Measurements

| Plate Number | Exposure Energy MJ/cm$^2$ | Diffraction Efficiency % | Comments |
|---|---|---|---|
| B3 | 12 | 63% | best transmission |
| B5 | 9 | 10% | reflection |
| B6 Embossing | 15 | 28% | best reflection |

Embossing

Some of the holographic optical elements fabricated according to the present invention were formed directly on surfaces of objects to be tested. Other HOE's were fabricated as embossed holographic stickers that can be glued to the surface.

The stickers are produced by growing metal shims from holograms that are originally recorded on photoresist covered glass plates. The shims are grown by evaporating silver on top of the hologram and then electroplating a thick layer of nickel. The nickel layer is then removed from the glass plate and the resulting shim is then used to stamp aluminum coated mylar sheets in a replication process that can produce thousands of copies. An adhesive backing is added to the sheet so that the holograms can then be applied to the test surface in a "peel-and-stick" fashion. These smart surface stickers offer the most exciting solution to the coating problem since they allow the holograms to be applied to almost any portion of a model surface with a minimum of surface preparation. The 8"×10" holographic plates were used for shim production and embossing.

Preliminary investigation of this technique has shown that the limiting factor in embossed holography is the surface smoothness that can be obtained. The smoothness is effected by; (1) the model surface itself, (2) the smoothness/flatness of the mylar layer and (3) the uniformity of the adhesive.

Alternate Substrates

The second method of coating involves the use of the glass plate as the substrate material. The hologram is recorded on the photoresist coated glass plate and the developed hologram is then silvered and coated with a thin layer of $SiO_2$ for protection. The plate is then cut to the desired size.

Rather than use the embossed mylar, the nickel shims, formed by electroplating, can be adhered to the model or test article. The shims can be grown to any thickness and glued using conventional epoxies. This method provides the highest optical quality and durability but is more expensive to produce than the mylar films.

The final method of sensor installation is to directly coat a test plug used in a wind tunnel fixture with photoresist and record the hologram on the coated plug. The surface could then be silvered in a vacuum chamber and used. This method has the disadvantage of allowing only one type of hologram per plug.

Coating and Curved Surface Development

Various methods of coating photoresist onto surfaces were tested.

One method of coating surfaces which we tested was using a spray. A commercial air gun was purchased and used with compressed nitrogen to spray photoresist on glass plates. We were eventually able to obtain reasonable quality flat plates with this method; however, even the best plates suffered from aberrations due to the paint drying with a slight amount of surface roughness or "orange peel." The best results were obtained using a two pass method where an initial thin layer was deposited followed by a thicker layer. With continuing development, this method could prove to be satisfactory but at this point it has been abandoned in favor of other techniques.

In an effort to obtain high quality flat glass plates, a pouring or drip coat method was investigated. In this method, a large pool of resist is deposited on the substrate using a syringe and the puddle is rolled around until the entire surface is coated. The plate is then turned sideways so the excess resist can run off. While this method tends to leave non uniform coating in the top to bottom direction, the surface smoothness was vastly improved over the spray method. Many 4"×5" plates were coated using this method with an approximate yield of about 50%. With the exception of particulate matter settling on the plate and build-up near the edge, the plates coated using this method were of equal quality to those produced by Towne Laboratory, Inc., 1 U.S. Highway 206, P. O. Box 460, Summerville, N.J. 08876.

The final evolution in coating flat plates was to build a spin coating machine using 3000 RPM electric motor. The resist is poured onto the plate and allowed to flow over the surface. The plate is then spun at speeds between 1,000 and 3,000 RPM for 20 to 30 seconds. This results in an extremely uniform, thin coating of resist that is of professional quality. Stricter standards for the clean box and plate cleaning is the only remaining area of improvement necessary for the coating of our flat plates.

The spray coating technique offered an easily extendible technology to coat curved surfaces and was therefore chosen for our first attempt at coating. Since this method does not result in the best quality coatings, we have been developing an alternate technique. We have found that it is possible to coat thin, adhesive backed, acrylic, or mylar strips with photoresist and then stick them to the curved surface (provided the curvature is not excessive or compound). The resist sticker can then be exposed, removed, developed, silvered and placed back on the model. Alternatively, the entire model could be carried through the processing providing its size was not prohibitive. This method appears to have the best possibility for producing high quality, ultra smooth coatings since the photoresist deposition is done on optically flat glass in the spin coater.

Recording holograms on reflective (metal) surfaces poses an additional problem for the curved surface development. Attempts to deposit a layer of black paint prior to the photoresist coating were unsuccessful as the solvents in the resist would dissolve the paint. We are currently exploring the use of special, non-reactive, anti-reflection coatings to solve this problem.

LDV Testing

Figure 27:
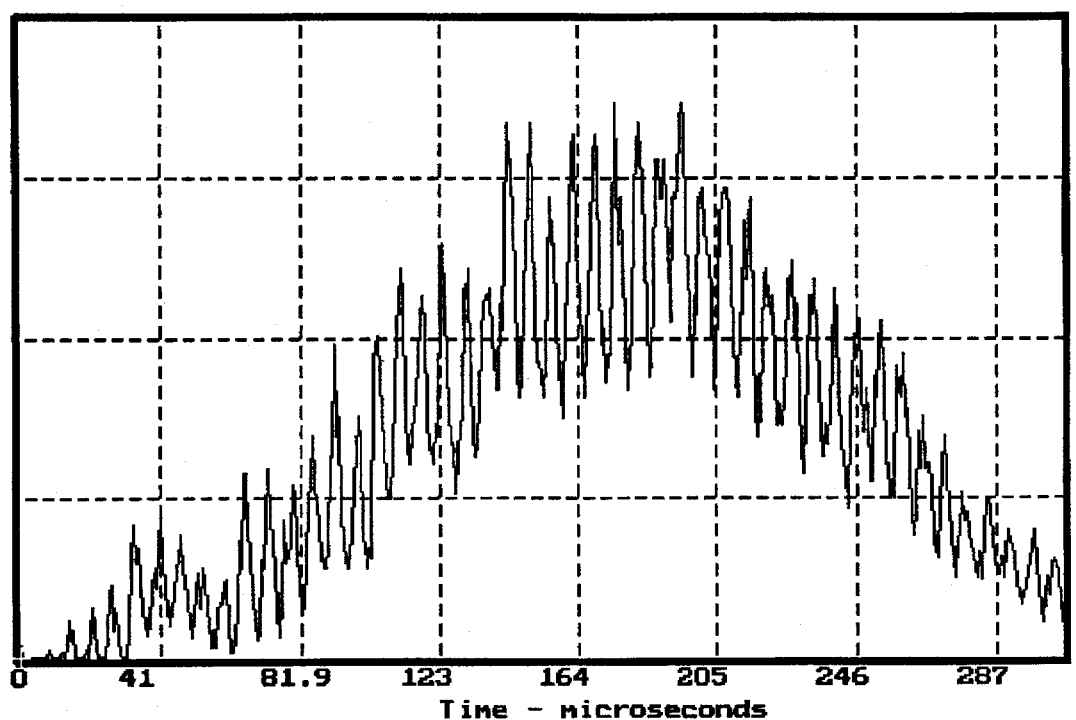
FIG. 27 is a measured LDV waveform obtained from apparatus shown in FIG. 22 and a pinhole on a wheel.
Figure 28:
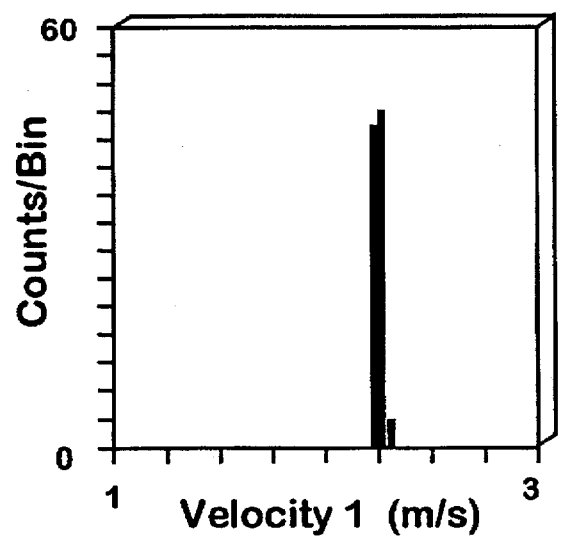
FIG. 28 is a histogram of data collected using the same conditions as FIG. 27.

A version of the PM5 smart surface LDV was tested using a pinhole mounted on a rotating wheel as a seeding device. The hologram was aluminized mylar glued to a glass substrate. About 50 mW of 488 nm light was used for the address beam. The beam separation was such that the resulting sample volume was 2 cm above the surface. The probe volume was 200 microns wide and the fringe spacing was 2.8 microns. Scattered light was collected using two in-line bi-convex lenses with 20 cm focal lengths. The combined imaging ratio was 1:1. The light was focused into a multimode fiber having a 50 micron core and delivered to a PMT and high-speed amplifier. The signal was then monitored by an oscilloscope and digitized by a PC. A typical Doppler burst measured by the system is shown in FIG. 27. FIG. 28 shows a histogram of data collected using the pinhole. The RMS distribution is one percent, showing good probe volume uniformity.

The PM5 sensor has also been tested in an actual aerodynamic environment. A calibration channel 10 feet×¾ inch in cross-section was fitted with an optical window across from a test plug. An aluminized mylar version of the PM5 sensor was glued to the test plug and was inserted so the sensor was flush with the channel wall. Ambient air was drawn through the channel using a fan. Water particles were introduced into the flow using a humidifier.

Figure 29A:
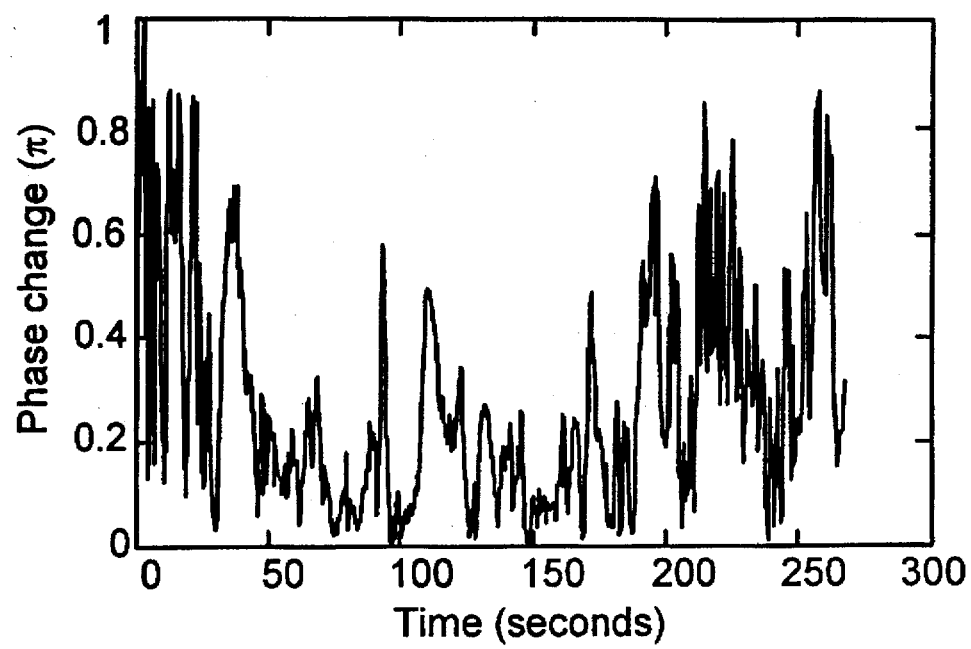
FIG. 29a is a plot showing the measured temporal stability of the optical breadboard system used to record the holographic optical elements.
Figure 29B:
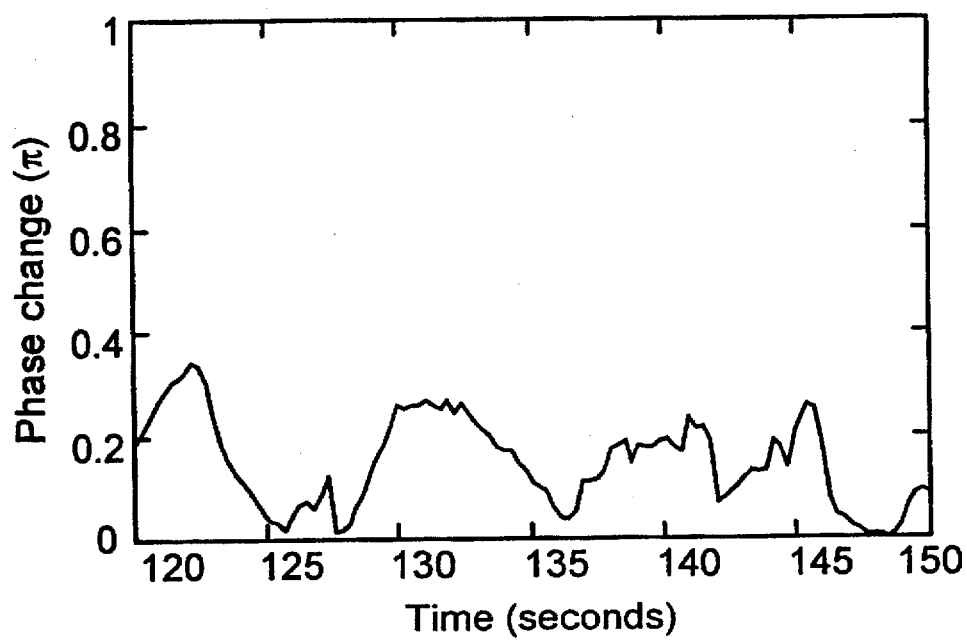
Figure 30:
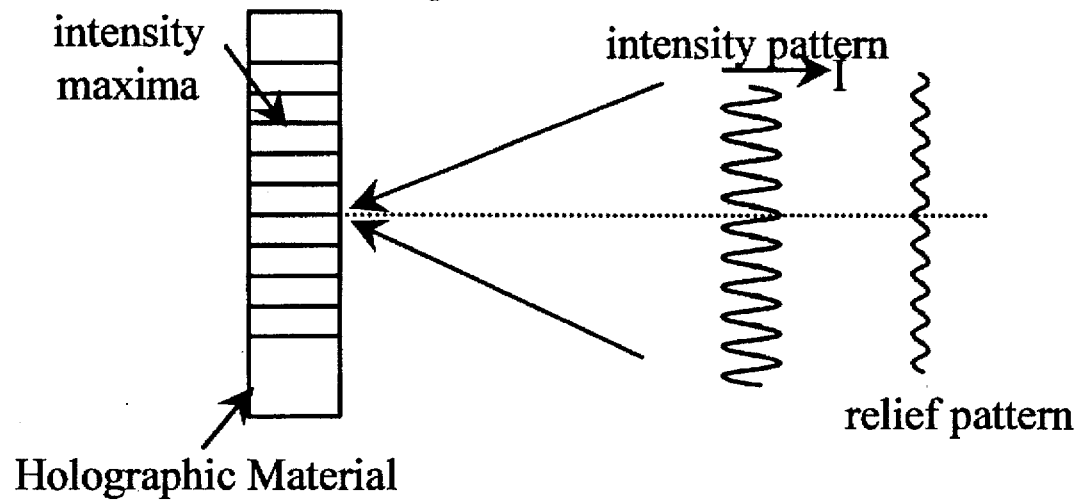
FIG. 30 is a schematic view of processes for recording transmission holograms and reflection holograms.
Figure 30:
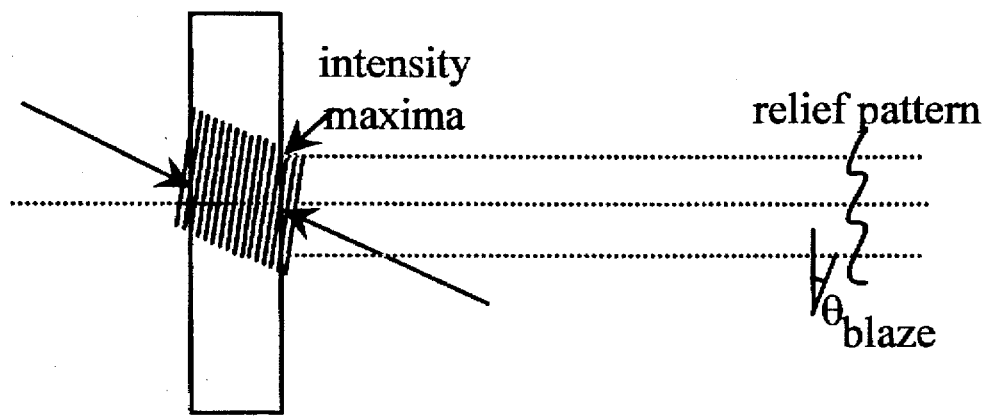
Figure 31A:
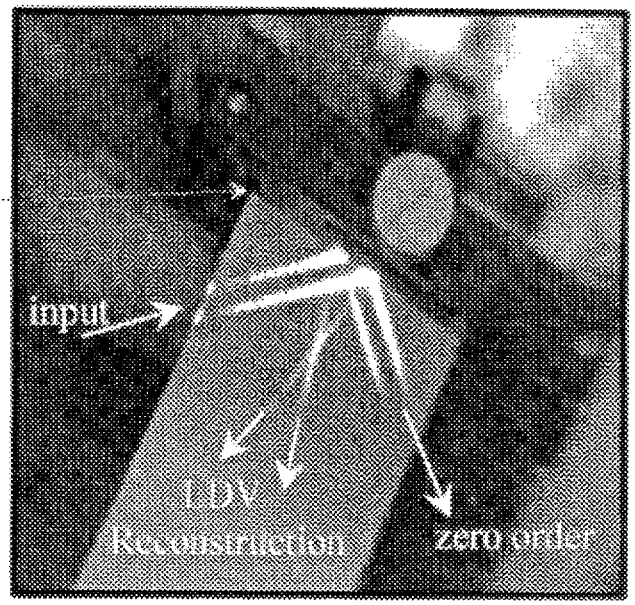
FIGS. 31 through 31E is a pictorial view of digitized images of reconstructed beams for an Adjustable Height Laser Doppler Velocimeter (AHLDV), for various heights above a surface.
Figure 31B:
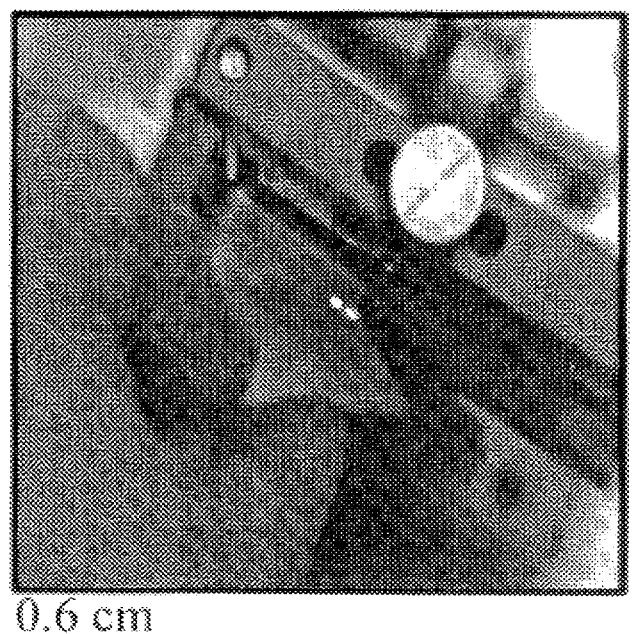
Figure 31C:
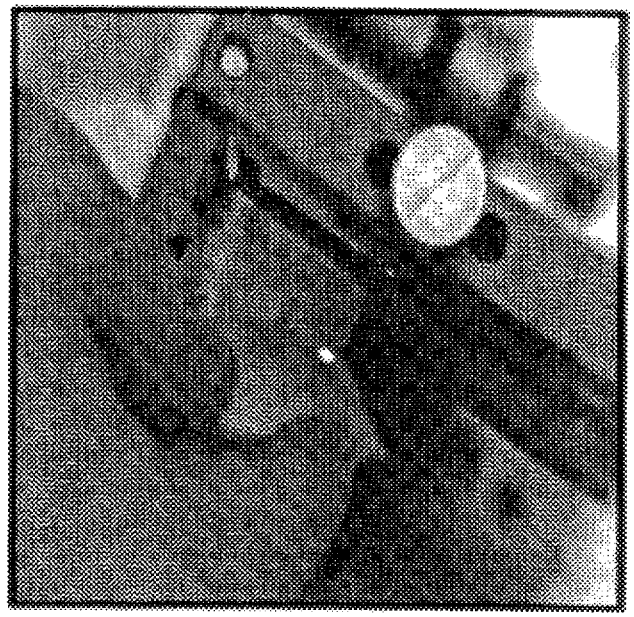
Figure 31D:
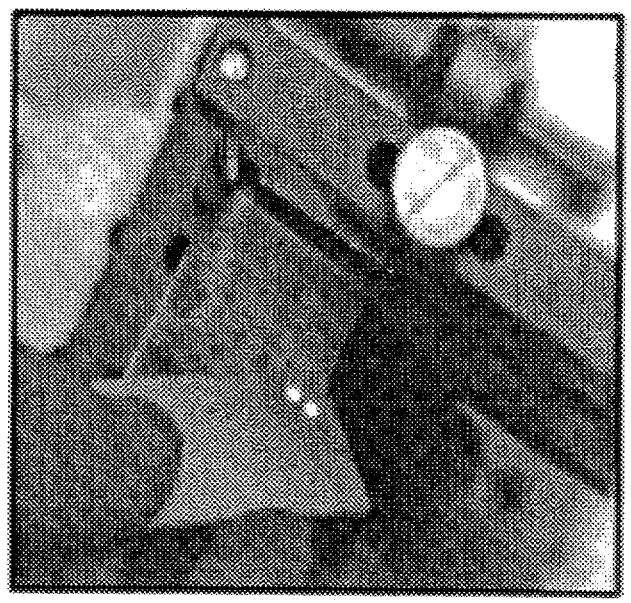
Figure 31E:
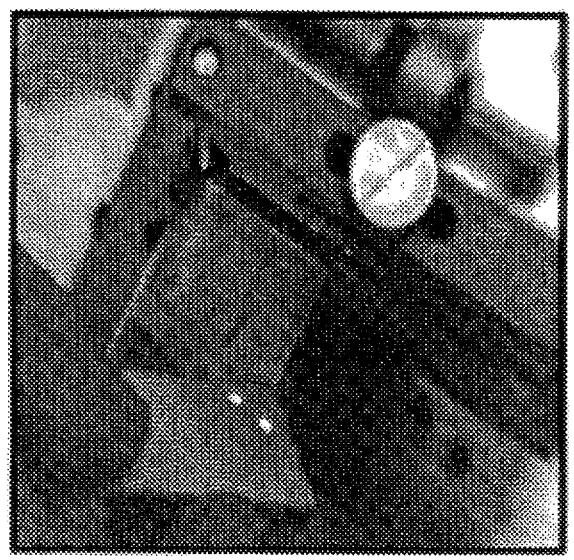

The sensor was addressed by a 50 mw 488 nm laser having a beam separation that resulted in a 10 mm probe volume height. The test set up was otherwise identical to that used in the measurement for FIG. 27. A histogram of the signals obtained is shown in FIG. 29. The RMS value of 10% is typical for turbulent flow regimes.

Digitized images of the reconstructed beams for the PM5 hologram, including the sample volume, are shown in FIG. 31. This reconstruction was made using unfocused 1.4 mm laser beams from the HeCd laser operating at 441.6 nm.

Calculations to estimate the received LDV signal were made using a program previously written at MetroLaser, TBIR. Table 9 lists the formulas used in calculating the signal frequency, volume, height and magnitude of the randomly scattered light signal. The parameters used for the TBIR program are also listed. The calculated ratio of LDV signal to scattered light is plotted for several crossing angles in FIG. 32. The primary conclusions from these calculations are that, with a seeding particle size greater than 1 µm, (1) sufficient signal to noise may be obtained by focusing the beam to 100 µm and (2) a 20 degree crossing angle proves a good compromise between sample volume, Doppler frequency and signal to noise. Higher flow velocities will require smaller crossing angles in order to maintain Doppler signals below 50 MHz, the frequency limit of our processing electronics.

TABLE 9

LDV Calculations

Fringe spacing – $\lambda = \Lambda = \dfrac{\lambda}{2\sin(\theta/2)}$ $\theta$ – full angle between beams, $\lambda = .442$ µm Signal frequency – $f = f = \dfrac{v}{\Lambda}$ v – velocity of flow
UCI tests: v = 50 m/s (max)

| θ | f | h |
|---|---|---|
| 5° | 10 MHz | 2.2 mm |
| 10° | 20 MHz | 1 mm |
| 20° | 40 MHz | .57 mm |

Volume height – $h = h = \dfrac{W}{\tan(\theta/2)}$

W – focused waist of beam (~100 µm)
Signal to scatter:

Scattered signal – $S = \left[\dfrac{A\tan(1/2F)}{\pi}\right]^2 \cdot P\ 58$

F – of number of lens, P – laser power, $S_f$ – estimated fringes of light scatter
LDV signal – from TBIR program
P = 80 mw, N = 20%, F = 50, θ = φ = 90° (forward scatter)

Figure 32:
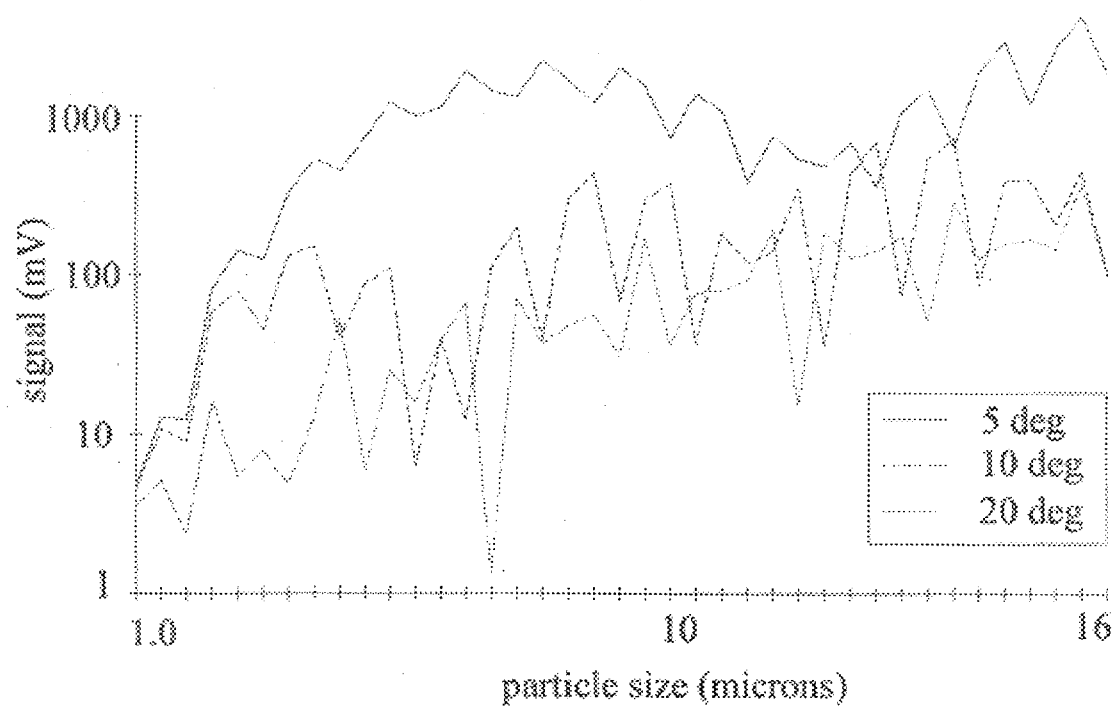
FIG. 32 is a plot of calculated signal to scatter ratios for an AHLDV utilizing various crossing angles.

The calculated ratio of signal to noise (scatter) is shown in FIG. 32.

Figure 33A:
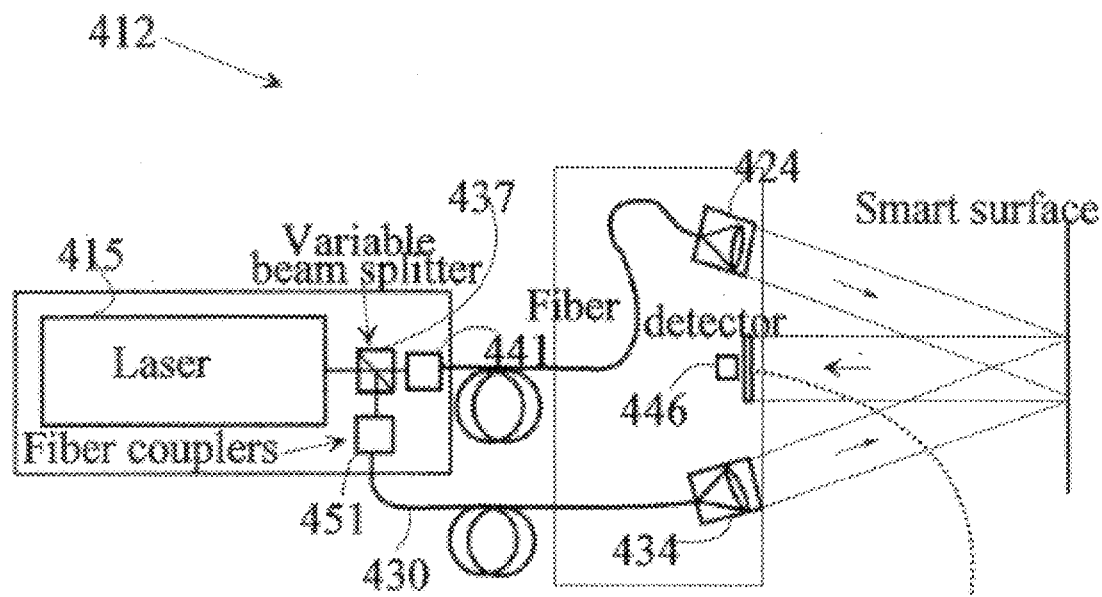
FIG. 33A is a schematic view of an experimental strain/ temperature gauge according to the present invention.
Figure 33B:
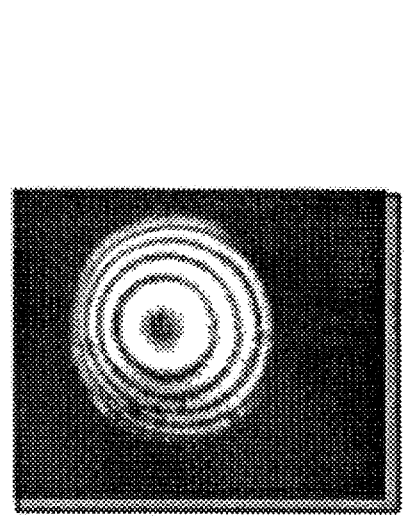

Reconstructing the hologram with two beams is shown in FIG. 33b, using the set up shown in FIG. 33a. The pattern size is approximately one inch and shows good uniformity and contrast. FIG. 33c shows a way to decode the strain signal using two photodetectors and an electrical heterodyne detector.

Figure 34:
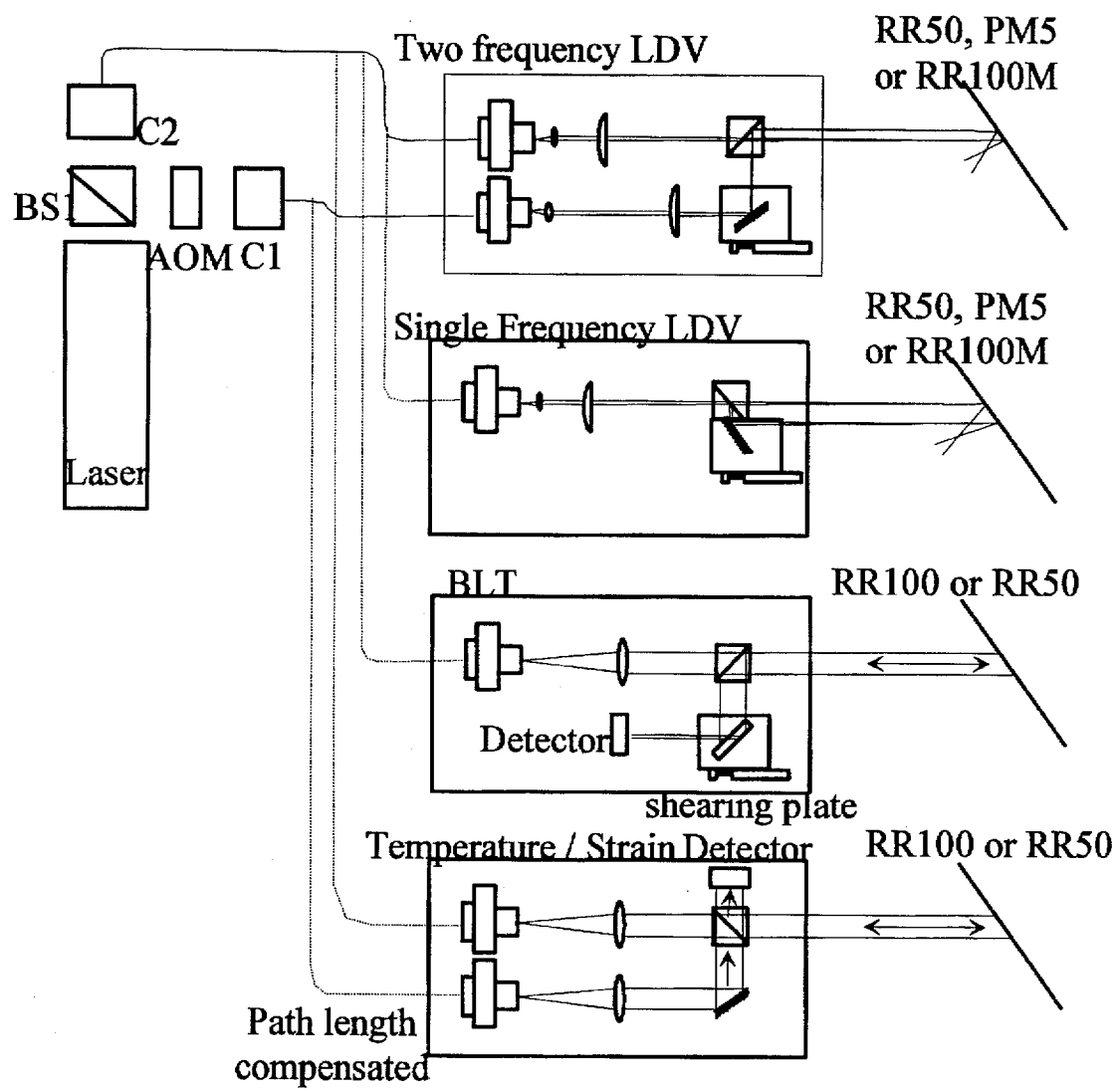
FIG. 34 is a pictorial summary of the different types of transmitting apparatus for making aerodynamic measurements using the PM5, RR50 and RR100(M) smart surfaces that are currently being tested.

Some of the possible aerodynamic uses for the three types of holographic sensors that have been embossed in the aluminized mylar are shown in FIG. 34. The first application is the two frequency LDV where a frequency shift is introduced onto one of the beams using an acousto-optic modulator. This allows measurement of the flow direction as well as its magnitude. The second apparatus is a simpler, single frequency version of the previous transmitter. The third is the boundary layer transition monitor that can detect regions where flow streams transition from laminar to turbulent. The final sensor is the strain/temperature gauge. Note the RR50 smart surface may be used for all of the measurements, making it the most versatile.

Additional calculations have been made to estimate the magnitude of the shear stress signal under the practical working conditions of the wind tunnel used in our tests and are outlined in Table 10. It was concluded that the use of aluminum or silver holograms will not be able to resolve the small fluid dynamic shear stress force (or skin friction) produced in a low speed wind tunnel, i.e., one having a velocity of less than Mach 1. Estimates of the sheer stress produced under super sonic conditions also show that the metallic sensor will be unable to resolve the signal. Initial investigations into using rubber holograms show that fluid dynamic sheer stress forces may be resolvable, however, there are serious questions about the calibration of the sensors since the mechanical properties are greatly affected by curing methods, fatigue and temperature.

TABLE 10

Shear Stress Calculation*

$R_{ex} = P_{\bowtie}V_{\bowtie}X/N_{\bowtie}$  (Reynolds number)
$N = 1.8 \times 10^5$ ry/ms (air) aboslute viscosity coeff.
V = flow velocity
P = density = 1.23 kg/m3 (air at 1atm)

$\gamma_\infty = .6449_{\bowtie} / \sqrt{R_{ex}}$  (sheer stress)

$9_{\bowtie} = 1/29_{\bowtie}V^2_{\bowtie}$  ∞ – free stream values
Flat plate in channel, $V_\infty = 50$ M/sec 1 cm from leading edge $R_{ex} = \dfrac{1.23(50)(.01)}{1.8 \times 10^5} = 3.4 \times 10^4$ $\gamma_\infty = \dfrac{.664(1.23)(50^2)}{2\sqrt{3.4 \times 10^4}} = 5.5 N/M$

What is claimed is:

1. A method for remotely measuring one or more physical characteristics at or near the surface of a curved object, said method comprising;

a. conformally affixing to said surface of said object a thin flexible film, at least a portion of which contains a hologram, said hologram forming in response to illumination by electromagnetic radiation an image which varies in a predetermined way in response to variations in said physical characteristics at or near said surface, said film including a mirrored surface adjacent said hologram, b. illuminating said film with one or more address beams of coherent light, c. collecting at least a portion of light emanating from said film in response to said illumination, and d. analyzing said collected light to determine variations in said physical characteristics at or near said object surface that cause a variation in said collected radiation.

2. A method for remotely measuring one or more physical characteristics at or near the surface of a curved object, said method comprising;

a. conformally affixing to said surface of said object a thin flexible film, at least a portion of which contains a hologram, said hologram forming in response to illumination by electromagnetic radiation an image which varies in a predetermined way in response to variations in said physical characteristics at or near said surface, said hologram being further defined as including an image of two beams intersecting at or above the surface of said film, b. illuminating said film with one or more address beams of coherent radiation producing at or above said surface a sample volume containing a plurality of interference fringes usable to measure the Laser Doppler Velocity of particles flowing through said volume, c. collecting at least a portion of radiation diffracted from said film in response to said illumination, and d. analyzing said collected radiation to determine variations in said physical characteristics at or near said object surface that cause a variation in said collected radiation.

3. The method of claim 2 wherein said hologram is further defined as including a pair of adjacent gratings effective in producing in response to a pair of first and second parallel address beams first and second diffracted beams oblique to another.

4. The method of claims 2 or 3 wherein said coherent light illuminating said film is further defined as comprising two address beams laterally spaced apart from one another, said beams being effective in diffracting from said hologram a pair of diffracted beams intersecting to produce a sample volume spaced above said film a distance proportional to the lateral spacing between said address beams.

5. The method of claim 4 further including the step of adjusting the lateral spacing between said address beams, thereby adjusting the height of said sample volume above said film.

6. A method for remotely measuring one or more physical characteristics at or near the surface of a curved object, said method comprising;

a. conformally affixing to said surface of said object a thin, flexible film elastically deformable in concert with deformations of said surface of said object, at least a portion of said film which contains a hologram, said hologram forming in response to illumination by electromagnetic radiation an image which varies in a predetermined way in response to variations in said physical characteristics at or near said object surface, said hologram including a first uniaxial grating, whereby first deformations of said object surface parallel to said grating vector, i.e., perpendicular to lines comprising said grating, alters the spatial frequency of said grating, thereby causing a beam diffracted from said hologram in response to illumination by a coherent address beam to produce a change in fringe pattern proportional to strain of said object surface, b. illuminating said film with one or more address beams of coherent radiation, said coherent radiation illuminating said film comprising two address beams laterally spaced apart from one another incident upon laterally spaced apart locations of said film, said incident address beams producing two separate diffracted beams that interfere with one another to produce a fringe pattern proportional to the difference in spatial frequencies of said grating at said locations of said film, c. collecting at least a portion of radiation diffracted from said film in response to said illumination, and d. analyzing said collected radiation to determine variations in said physical characteristics at or near said object surface that cause a variation in said collected radiation.

7. The method of claim 6 further including the step of causing modulation of at least one of said address beams.

8. The method of claim 7 wherein said modulation is further defined as phase modulation.

9. An apparatus for remotely measuring a physical characteristic at or near the curved surface of an object, said object having a thin film affixed to at least a portion of said surface of said object, said film having formed in at least a portion thereof a hologram, said film being adapted to produce a first, retroreflected beam end a second, zero order diffracted beam, said first and second beams intersecting to form a sample volume near the surface of said film, said apparatus comprising, a. means for illuminating said film with one or more address beams effective in producing one or more diffracted beams from said grating, b. means for collecting at least a portion of said diffracted beams, and c. signal processing means for analyzing said collected portion of said diffracted beams, whereby physical characteristics at or near said object surface may be remotely determined.

10. An apparatus for remotely measuring a physical characteristic at or near the curved surface of an object, said object having a thin film affixed to at least a portion of said surface of said object, said film having formed in at least a portion thereof a hologram adapted to produce at least two diffracted beams intersecting at or above the surface of said film, said apparatus comprising, a. means for illuminating said film with one or more address beams effective in producing one or more diffracted beams from said grating, whereby illuminating said film with said address beam produces at or above said surface a sample volume containing a plurality of interference fringes, b. means for collecting at least a portion of said diffracted beams, and c. signal processing means for analyzing said collected portion of said diffracted beams, whereby physical characteristics at or near said object surface may be remotely determined.

11. The apparatus of claim 10 wherein said signal processing means is further defined as being adapted to measure the Doppler velocity of particles in said sample volume.

12. The apparatus of claim 11 wherein said film is further defined as including a mirrored surface adjacent said hologram.

13. The apparatus of claim 12 wherein said means for illuminating said film is further defined as comprising a first address beam incident upon said mirrored surface and a second address beam incident upon said hologram, said first and second address beams being so oriented with respect to said mirrored surface and said hologram so as to produce a first, reflected beam and a second, diffracted beam intersecting said reflected beam.

14. The apparatus of claim 11 wherein said film is further defined as including a pair of adjacent first and second holographic gratings effective in producing in response to a pair of parallel first and second address beams first and second intersecting address beams.

15. The apparatus of claim 14 wherein said means for illuminating said film is further defined as comprising means for producing a first address beam adapted to impinge upon said first grating, means for producing a second address beam incident upon said second grating, and means for moving said beams relative to one another thereby producing first and second diffracted beams intersecting in a sample volume spaced above said film a distance proportional to the relative spacing between said first and second address beams.

16. An apparatus for remotely measuring a physical characteristic at or near the curved surface of an object, said object having a thin film affixed to at least a portion of said surface of said object, said film being elastically deformable in concert with deformations of said surface of said object, said film having formed in at least a portion thereof a hologram containing a first uniaxial grating, whereby first deformations of said object surface perpendicular to lines comprising said first grating alter spacing between said lines, thereby causing a beam diffracted from said hologram in response to illumination by said address beam to produce a diffracted fringe pattern which changes in proportion to strain of said object surface, said apparatus comprising, a. means for illuminating said film with one or more address beams effective in producing one or more diffracted beams from said grating, said means for illuminating said film being further defined as comprising two address beams laterally spaced apart from one another incident upon laterally spaced apart locations of said film, said incident address beams being adapted to produce two separate diffracted beams that interfere with one another to produce a fringe pattern proportional to the difference in grating spacing at said locations of said film, b. means for collecting at least a portion of said diffracted beams, and c. signal processing means for analyzing said collected portion of said diffracted beams, whereby physical characteristics at or near said object surface may be remotely determined.

17. The apparatus of claim 16 wherein said means for illuminating said film is further defined as including modulation means for causing modulation of at least one of said address beams.

18. The apparatus of claim 17 wherein said modulation means is further defined as being adapted to cause phase modulation of said address beams.

19. A sensor adapted to be affixed to a curved surface of an object to permit remote measurement of physical properties at or near said object surface, said sensor comprising a thin, flexible film adapted to be affixed conformally to said object surface and containing a holographic image including a first diffraction grating, said sensor further including a specularly reflective surface adjacent said holographic image.

20. The sensor of claim 19 wherein said holographic image is further defined as including a second diffraction grating orthogonal to said first diffraction grating.

21. The sensor of claim 20 wherein said first and second diffraction gratings are optically formed in the same area of said sensor.

22. The sensor of claim 19 wherein said holographic image is further defined as including a second diffraction grating parallel to said first diffraction grating and having a beam angle inclined to that of said first diffraction grating.

* * * * *